(12) United States Patent
Rothschiller et al.

(10) Patent No.: US 12,182,380 B2
(45) Date of Patent: *Dec. 31, 2024

(54) TABBED USER INTERFACE

(71) Applicant: Microsoft Technology Licensing, LLC, Redmond, WA (US)

(72) Inventors: Chad Rothschiller, Edmonds, WA (US); Mujtaba Shabbir Khambatti, Sammamish, WA (US); Patrick Evan Little, Monroe, WA (US); Felix Andrew, Seattle, WA (US); Pooja Mehta, Redmond, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/358,614

(22) Filed: Jul. 25, 2023

(65) Prior Publication Data

US 2024/0028183 A1   Jan. 25, 2024

Related U.S. Application Data

(63) Continuation of application No. 17/827,117, filed on May 27, 2022, now Pat. No. 11,762,537.

(51) Int. Cl.
*G06F 3/0483* (2013.01)
*G06F 3/04812* (2022.01)
*G06F 3/0482* (2013.01)

(52) U.S. Cl.
CPC ........ *G06F 3/0483* (2013.01); *G06F 3/04812* (2013.01); *G06F 3/0482* (2013.01)

(58) Field of Classification Search
CPC ... G06F 3/0483; G06F 3/04812; G06F 3/0482
See application file for complete search history.

(56) References Cited

U.S. PATENT DOCUMENTS

| | | | |
|---|---|---|---|
| 8,762,879 B1* | 6/2014 | Goodger | G06F 16/957 715/764 |
| 2006/0184537 A1 | 8/2006 | Sauve et al. | |
| 2008/0005686 A1* | 1/2008 | Singh | G06F 3/04842 715/764 |
| 2009/0132405 A1 | 5/2009 | Scipioni et al. | |
| 2009/0327947 A1* | 12/2009 | Schreiner | G06F 3/0483 715/777 |

(Continued)

OTHER PUBLICATIONS

"International Search Report and Written Opinion Issued in PCT Application No. PCT/US23/019186", Mailed Date: Jul. 25, 2023, 10 Pages.

*Primary Examiner* — Daniel Samwel
(74) *Attorney, Agent, or Firm* — NovoTechIP International PLLC

(57) ABSTRACT

A data processing system implements displaying a tabbed user interface comprising a plurality of tabs for navigating among a plurality of electronic documents; determining a first tab of the plurality of tabs is associated with a first tab group according to a first grouping criterion; and causing a first tab group control element to be displayed proximate to the first tab, the first tab group control element providing a set of tools for accessing content associated with the first tab group and for creating new tabs associated with the first tab group.

20 Claims, 23 Drawing Sheets

(56) References Cited

U.S. PATENT DOCUMENTS

| | | | |
|---|---|---|---|
| 2011/0265027 A1* | 10/2011 | Lipstein | G06F 3/04855 |
| | | | 715/777 |
| 2012/0131485 A1* | 5/2012 | Svendsen | G06F 3/0483 |
| | | | 715/777 |
| 2014/0164960 A1* | 6/2014 | Kuo | G06F 3/0486 |
| | | | 715/760 |
| 2016/0139750 A1* | 5/2016 | Barrus | G06F 3/0481 |
| | | | 715/777 |
| 2016/0196040 A1* | 7/2016 | Kapadia | H04L 67/02 |
| | | | 715/738 |
| 2017/0039172 A1* | 2/2017 | Broomhall | G06F 16/958 |
| 2018/0307390 A1* | 10/2018 | Fang | G06F 9/44 |

* cited by examiner

TABBED USER INTERFACE

CROSS-REFERENCE TO RELATED APPLICATION

This application claims the benefit of priority from pending U.S. patent application Ser. No. 17/827,117, filed on May 27, 2022, and entitled "TABBED USER INTERFACE." The entire contents of the above-referenced application is incorporated herein by reference.

BACKGROUND

A tabbed user interface enables a user to have multiple documents, web pages, web applications, and/or other types of electronic files open in a browser application. The flexibility provided by tabbed interface often leads to users opening a multitude of tabs. However, navigating through numerous open tabs may quickly become confusing, thereby reducing efficiency, and negatively impacting the user experience. Hence, there is a need for improved systems and methods that provide a technical solution for improving the ability to organize tabs in a tabbed interface to facilitate navigation of the tabs.

SUMMARY

An example data processing system according to the disclosure may include a processor and a machine-readable medium storing executable instructions. The instructions when executed cause the processor to perform operations including displaying a tabbed user interface comprising a plurality of tabs for navigating among a plurality of electronic documents; determining a first tab of the plurality of tabs is associated with a first tab group according to a first grouping criterion; and causing a first tab group control element to be displayed proximate to the first tab, the first tab group control element providing a set of tools for accessing content associated with the first tab group and for creating new tabs associated with the first tab group.

An example method implemented in a data processing system for providing a tabbed user interface includes displaying the tabbed user interface comprising a plurality of tabs for navigating among a plurality of electronic documents; determining a first tab of the plurality of tabs is associated with a first tab group according to a first grouping criterion; and causing a first tab group control element to be displayed proximate to the first tab, the first tab group control element providing a set of tools for accessing content associated with the first tab group and for creating new tabs associated with the first tab group.

An example machine-readable medium on which are stored instructions. The instructions when executed cause a processor of a programmable device to perform operations of displaying a tabbed user interface comprising a plurality of tabs for navigating among a plurality of electronic documents; determining a first tab of the plurality of tabs is associated with a first tab group according to a first grouping criterion; and causing a first tab group control element to be displayed proximate to the first tab, the first tab group control element providing a set of tools for accessing content associated with the first tab group and for creating new tabs associated with the first tab group.

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter. Furthermore, the claimed subject matter is not limited to implementations that solve any or all disadvantages noted in any part of this disclosure.

BRIEF DESCRIPTION OF THE DRAWINGS

The drawing figures depict one or more implementations in accord with the present teachings, by way of example only, not by way of limitation. In the figures, like reference numerals refer to the same or similar elements. Furthermore, it should be understood that the drawings are not necessarily to scale.

DETAILED DESCRIPTION

Figure 1:
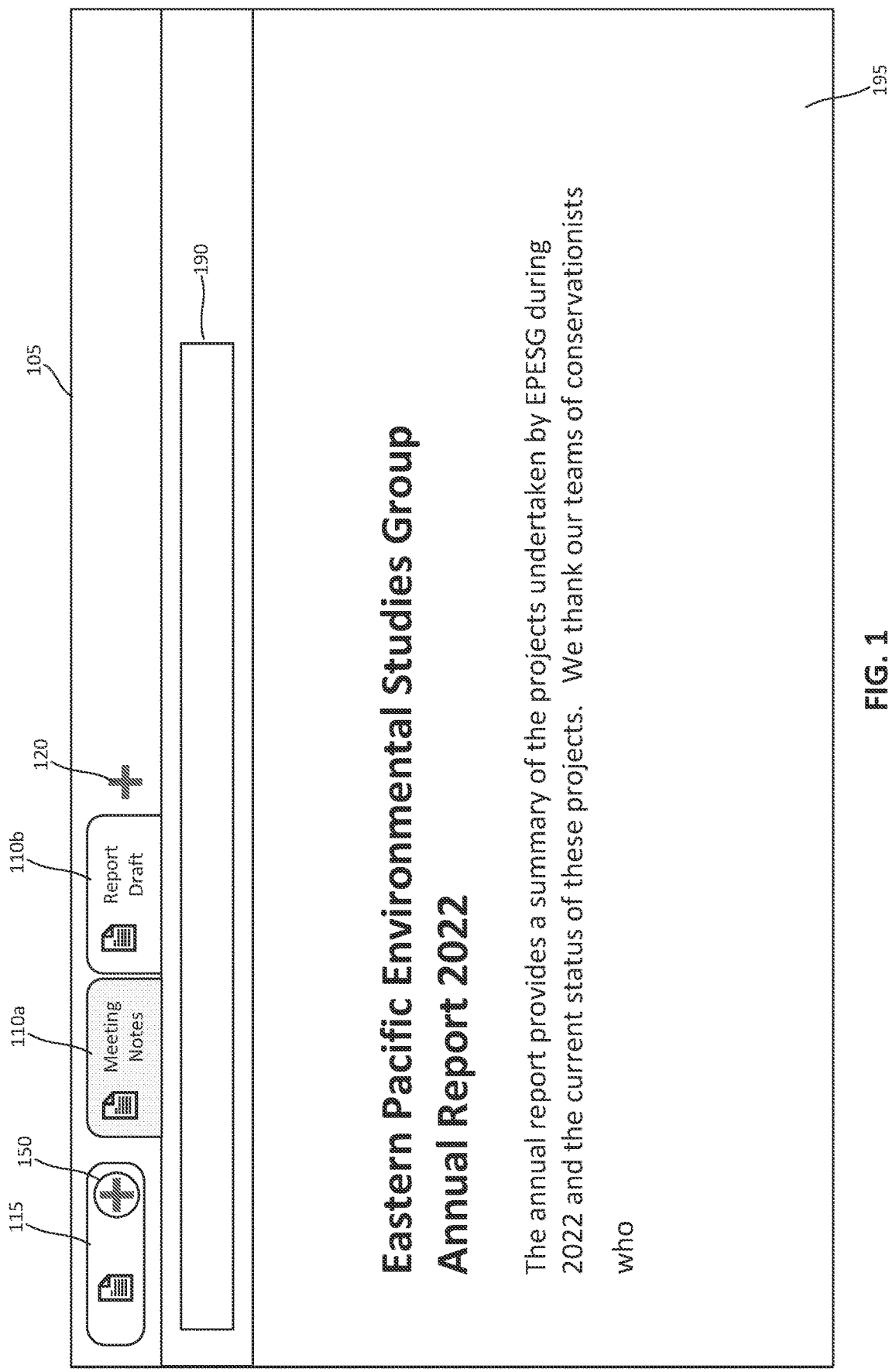
FIG. 1 is a diagram showing an example tabbed user interface that may be implemented according to the techniques described herein.

In the following detailed description, numerous specific details are set forth by way of examples in order to provide a thorough understanding of the relevant teachings. However, it should be apparent that the present teachings may be practiced without such details. In other instances, well known methods, procedures, components, and/or circuitry have been described at a relatively high-level, without detail, in order to avoid unnecessarily obscuring aspects of the present teachings.

Techniques for implementing a tabbed user interface are provided that, among other benefits, simplify navigating through such a tabbed user interface and improve user workflow. Users may become quickly overwhelmed when working with documents in multiple tabs. This may be exacerbated when the user is working with documents associated with multiple applications. These techniques provide tools for organizing the tabs of the tabbed user interface and for quickly accessing application-specific tools to improve user productivity. Specifically, these techniques organize tabs into tab groups based on application associated with the tab and/or other group criteria. In some implementations, these techniques organize tabs into application-specific tab groups by automatically identifying the application with which each tab is associated and grouping tabs by application. In other implementations, other grouping criteria may be used in addition to or instead of the application, including but not limited to the subject matter or content associated with the tab or a particular project, a task with which the content is associated, or the browsing history of the user. No explicit actions are needed by the user. The user does not need to install a browser extension or other software for organizing the tabs into tab groups. Furthermore, the user does not need to explicitly take any actions, such as creating a label for the tab group or move the tabs into the tab group.

Each tab group is also associated with a tab group control element on the tabbed user interface that provides application-specific controls. These controls facilitate quickly opening tabs for performing various application-specific tasks, including but not limited to creating, accessing, viewing, and/or modifying application-specific content. The controls also include functionality for hiding the tabs associated with an application to reduce visual clutter on the tabbed user interface and for selectively displaying the hidden tabs. The controls also include functionality for configuring tab group properties, for example whether or not the tab group automatically collapses when navigating away from the tab group. Furthermore, tab groups associated with applications that are not associated with a currently selected tab in the tabbed user interface may be automatically hidden. The term "automatically hidden" as used herein refers to the application detecting that the user has navigated away from the tabs associated with the tab group and proactively collapsing the tab group. Navigating away from the tab group includes but is not limited to creating a new tab or selecting a tab that is outside of the tab group.

These techniques may significantly improve the user experience by reducing visual clutter on the user interface to allow the user to focus on tabs associated with a particular application. Furthermore, placing application-specific controls proximate to the tabs associated with the application may help the user maintain their focus on a particular task and conserve the use of computer processing resources by reducing the number of clicks or other user inputs required to navigate the tabbed user interface. These and other technical benefits of the techniques disclosed herein will be evident from the discussion of the example implementations that follow.

FIG. 1 shows an example of a horizontal tabbed user interface 105 that may be implemented according to the techniques described herein. The user interface 105 may be generated by a tab management unit of the browser application or web-enabled native application of a client device. The user interface 105 includes an address bar 190 that may be used to enter a Uniform Resource Locator (URL) for a document or web-based application and/or display the URL associated with content being displayed in a currently selected tab of the tabbed user interface 105. The tabs 110a and 110b in this example are each displaying content associated with a web-based word processing application, and tab 110b is the currently selected or "active" tab. The user interface 105 also includes a content pane 195 in which first content associated with the active tab 110b is displayed.

The user interface 105 also includes a tab group control element 115 on the tab bar proximate to the tabs 110a and 110b. The tab group control element 115 provides application-specific controls including but not limited to creating, accessing, viewing, and/or modifying application-specific content. The tab group control element 115 may be automatically added to the tabbed user interface 105 in response to one or more tabs associated with the application being opened. The examples that follow illustrate how a user may interact with the tab group control element 115 to improve the user workflow and experience.

Figure 2:
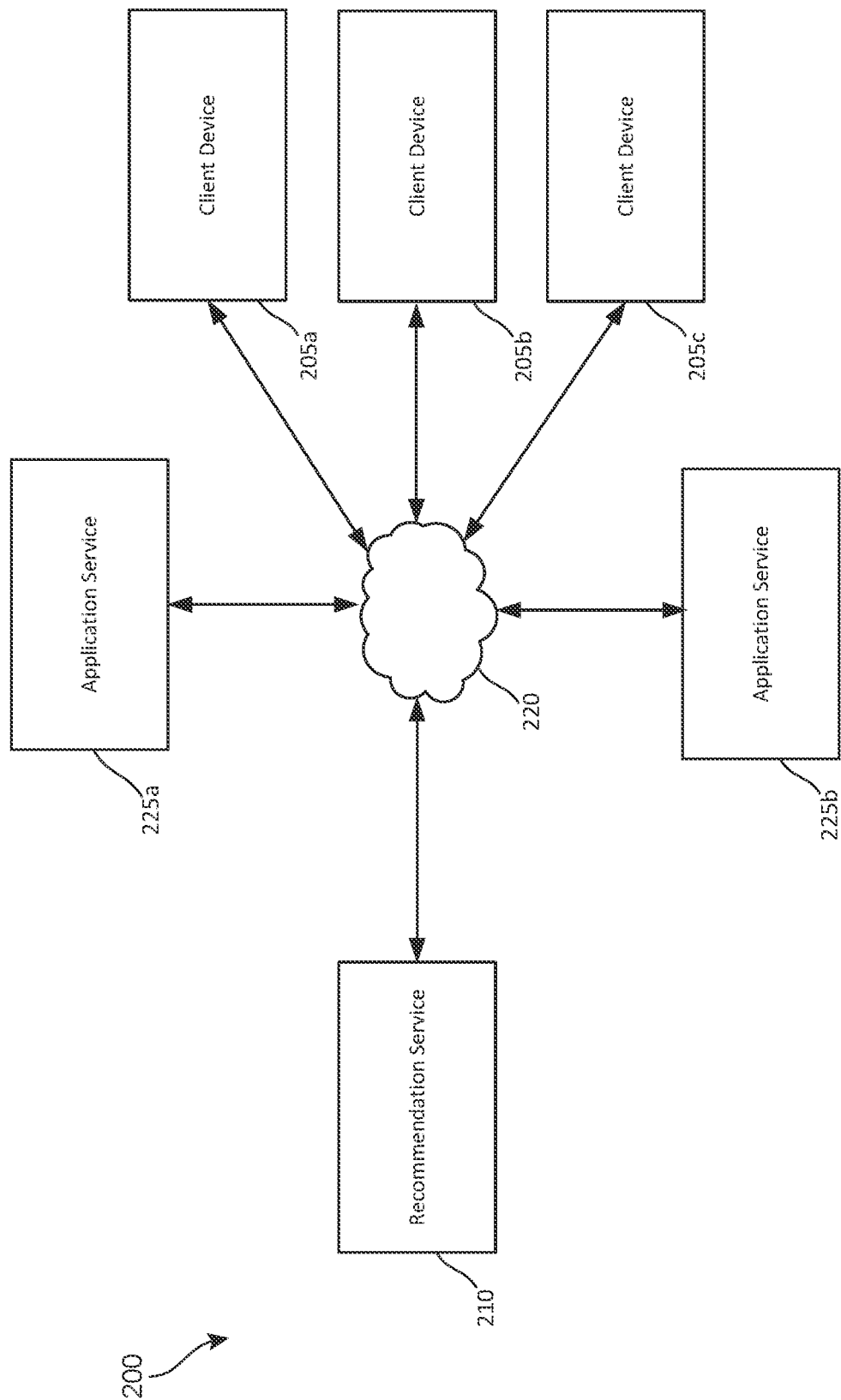
FIG. 2 is a diagram showing an example computing environment in which the techniques disclosed herein may be implemented.

FIG. 2 is a diagram showing an example computing environment 200 in which the techniques disclosed herein for providing an improved tabbed user interface may be implemented. The computing environment 200 may include a recommendation service 210. The example computing environment 200 may also include client devices 205a, 205b, and 205c (collectively referred to as client device 205) and application services 225a and 225b (collected to referred to as application service 225). The client devices 205a, 205b, and 205c may communicate with the recommendation service 210 and/or the application service 225 via the network 220. The network 220 may be a combination of one or more public and/or private networks and may be implemented at least in part by the Internet.

In the example shown in FIG. 2, the recommendation service 210 is implemented as a cloud-based service or set of services. The recommendation service 210 may be configured to receive a request for recommendations for electronic documents that may be presented on the tabbed user interface of a browser application or other web-enabled native application on the client devices 205a, 205b, and 205c. The term "electronic document" as used herein can be representative of any document or component in electronic form that can be created by a computing device, stored in a machine-readable storage medium, and/or transferred among computing devices over a network connection or via a machine-readable storage medium. Examples of such electronic documents include but are not limited to word processing documents, presentations, spreadsheets, websites (e.g., SharePoint sites), digital drawings, media files, components thereof, and the like. The native application or other web-enabled native application may be used to access web-based content available from various sources, including but not limited to the application services 225a and 225b. In some implementations, the recommendation service 210, or at least a portion of the functionality thereof, may be implemented by the application services 225a and 225b to provide content recommendations for users of the application services.

The application services 225a and 225b may provide cloud-based software and services that are accessible to users via the client devices 205a, 205b, and 205c. The application services 225a and 225b may include various types of applications, such as but not limited to a communications and/or collaboration platform, a word processing application, a presentation design application, and/or other types of applications. The application services 225a and 225b may provide functionality for users to consume, create, share, collaborate on, and/or modify various types of electronic content, such as but not limited to textual content, imagery, presentation content, web-based content, forms and/or other structured electronic content, and other types of electronic content. The application services 225a and 225b may provide functionality for users to collaborate on the creation of the electronic content. The application services 225a and 225b may also provide a communication platform for users to communicate via email, text messages, audio and/or video streams as part of a communication session.

The application services 225*a* and 225*b* and/or the client devices 205*a*, 205*b*, and 205*c* may submit contextual information to obtain content recommendations to be presented to a user of the client devices 205*a*, 205*b*, and 205*c*. The contextual information may include information that identifies the user for whom the recommendations are to be provided and may include application information that identifies an application for which the recommendation is being requested. The example implementations which follow demonstrate how these recommendations may be determined by the recommendation service 210 and presented on a user interface of the client devices 205*a*, 205*b*, and 205*c*.

The client devices 205*a*, 205*b*, and 205*c* are each a computing device that may be implemented as a portable electronic device, such as a mobile phone, a tablet computer, a laptop computer, a portable digital assistant device, a portable game console, and/or other such devices. The client devices 205*a*, 205*b*, and 205*c* may also be implemented in computing devices having other form factors, such as a desktop computer, vehicle onboard computing system, a kiosk, a point-of-sale system, a video game console, and/or other types of computing devices. While the example implementation illustrated in FIG. 2 includes three client devices, other implementations may include a different number of client devices that may utilize the application service 225 and/or the recommendation service 210. Furthermore, in some implementations, the application functionality provided by the application service 225 may be implemented by a native application installed on the client devices 205*a*, 205*b*, and 205*c*, and the client devices 205*a*, 205*b*, and 205*c* may communicate directly with the recommendation service 210 over a network connection.

In the example shown in FIG. 2, the recommendation service 210 is shown as a cloud-based service that may be accessed over a network. However, other implementations of the recommendation service 210 may be achieved by the application service 225 or by the client devices 205*a*, 205*b*, and 205*c*. In other implementations, the functionality of the recommendation service 210 and/or the application service 225 described herein may be carried out on the client devices 205*a*, 205*b*, and 205*c*.

Figure 3A:
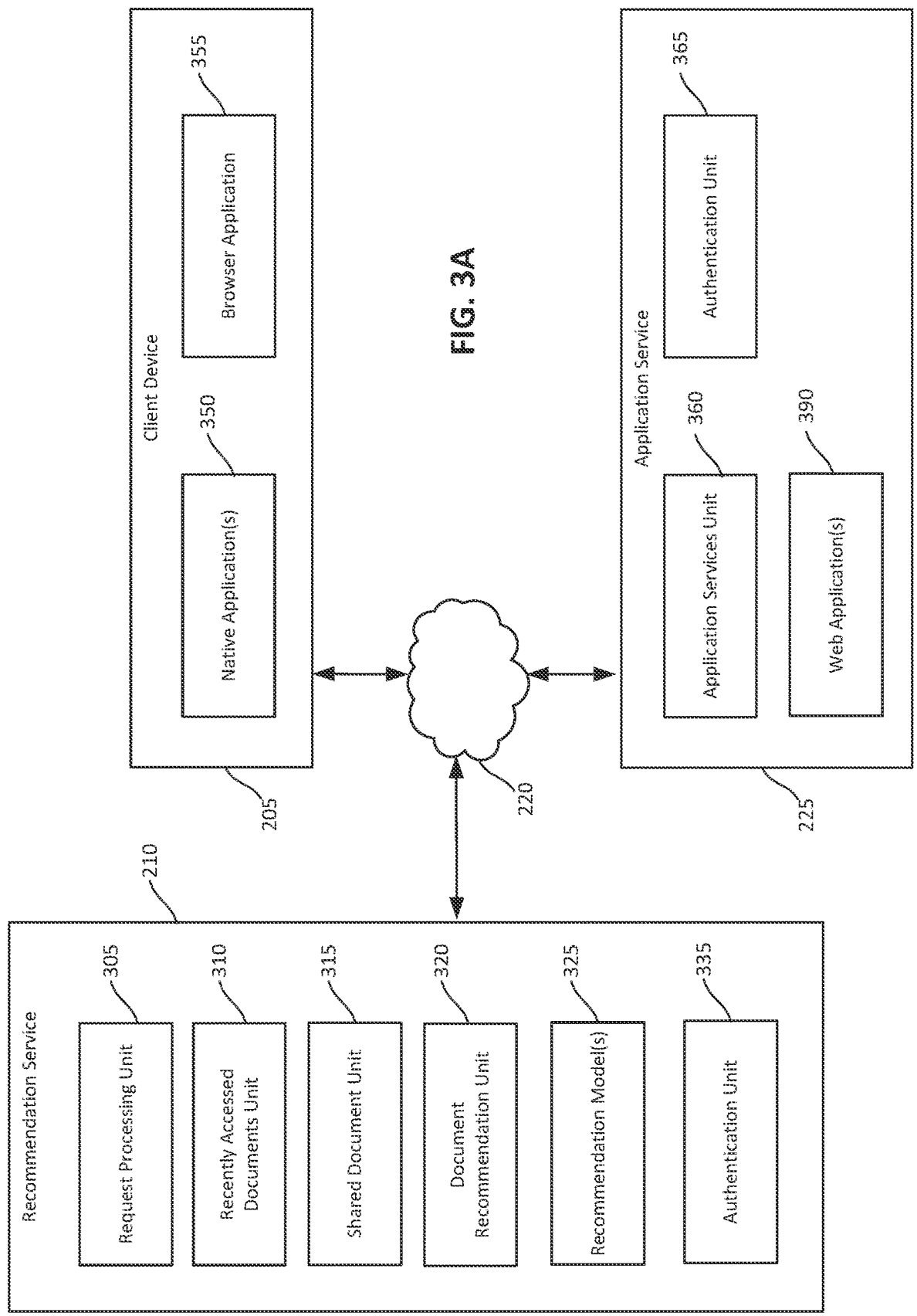
FIGS. 3A and 3B are examples of architecture that may be used, at least in part, to implement the client devices, the application services, and the recommendation service shown in FIG. 2.

FIG. 3A is a diagram showing additional features of the recommendation service 210, the client device 205, and the application service 225. The recommendation service 210 may include a request processing unit 305, a recently accessed documents unit 310, a shared document unit 315, a document recommendation unit 320, one or more language processing models 325, and an authentication unit 335.

The request processing unit 305 may be configured to receive requests for electronic documents to be suggested to a user of the client device 205. The recommendations may be presented to a web browser, such as the browser application 355, or in a web-enabled native application, such as the native application 350, which may provide functionality for a user to access, modify, create, and/or otherwise consume multiple electronic documents and/or other content in a tabbed user interface. The request processing unit 305 may provide various types of recommendations to the user. The request processing unit 305 may obtain the recommendations from the recently accessed documents unit 310, the shared document unit 315, and the document recommendation unit 320.

The recently accessed documents unit 310 may be configured to suggest one or more documents that the user has recently accessed. In some implementations, the recently accessed documents unit 310 may obtain recently accessed documents that are associated with a particular application. The request received by the request processing unit 305 may identify a particular application for which the recently accessed documents are requested. The application services, such as the application service 225, may maintain a list of documents that the user has recently accessed. The application services may implement an application programming interface (API) that provides functionality for querying for data associated with the application services, including a functionality for querying for recently accessed documents. The recently accessed documents unit 310 may query the API associated with the application service for which the request was received. In some implementations, the API may be implemented by Microsoft Graph®. The recently accessed documents unit 310 may obtain a list of documents in response to the query and provide those documents to the request processing unit 305 to be provided to the client device 205 for presentation to the user. The recently accessed documents unit 310 may be configured to preprocess the list of documents prior to providing the documents to the request processing unit 305. Such preprocessing may include but is not limited to discarding documents for which the most recent access exceeds a threshold value and/or ranking the documents based on how recently the documents were last accessed.

In some implementations, the recently accessed documents unit 310 may utilize the browser history of the user when determining the recently accessed documents. The browser history may be used in addition to or instead of querying the application service 225 for recently accessed documents.

The shared document unit 315 may be configured to suggest one or more electronic documents that have been shared with the user or by the user. The shared document unit 315 may query the API provided by the application service 225 and/or other such application services. The shared document unit 315 may be configured to limit the query for the shared documents to documents of a type that may be created and/or consumed using an application for which the document recommendations have been requested.

The document recommendation unit 320 may be configured to provide document recommendations that have not been previously accessed by the user and/or shared with the user by another user. The document recommendation unit 320 may rely on the one or more recommendation models 325 to predict electronic content that may be relevant to a user of the client device 205. The one or more recommendation models 325 may be configured to receive contextual information identifying the user and/or the application for which recommendations are being requested as an input and may output a list of documents that may be relevant to the user. The one or more recommendation models 325 may be trained to determine that a document may be relevant based on a number of factors, including but not limited to subject matter of documents that the user has contributed to and/or consumed recently, the type of job or role associated with the user, one or more areas of expertise associated with the user, an organization or organizations to which the user belongs or that employs the user, and/or other factors that indicate that a particular document may be relevant to the user. In an enterprise environment, the documents may be selected from a corpus of documents that have been created by others within the enterprise. In other implementations, the documents may be drawn from a corpus of publicly available documents. The documents may be limited to a specific content type or content types that may be created and/or consumed by an application for which the document recommendations have been requested.

In some implementations, the document recommendation unit 320 is configured to obtain relevant document information from a search history associated with the user. The user's recent searches may be used to identify subject matter of interest to the user. The document recommendation unit 320 may provide the search history information to the one or more recommendation models 325 as an input for identifying relevant documents. The documents may be identified from a corpus of enterprise documents, from documents available from one or more third-party content sources which may be available via the Internet, or from one or more additional sources.

The application service 225 may include an application services unit 360 and/or an authentication unit 335. The application services unit 360 may be configured to provide functionality for users to consume, create, share, collaborate on, and/or modify various types of electronic content. The application services unit 360 may provide a web-based interface to enable users to access at least a portion of the services provided by the application service 225. In other implementations, users may access the services provided by the application service 225 via one or more native applications 350. The application services unit 360 may in turn obtain the various readability services provided by the recommendation service 210.

The authentication unit 335 may provide functionality for verifying whether users are permitted to access the services and/or documents provided by the application service 225 and/or the recommendation service 210. The authentication unit 335 may provide functionality for receiving authentication credentials for the users from their respective client device 205. The authentication unit 335 may be configured to verify that the authentication credentials are valid and permit the users to access the services and/or documents provided by the application service 225 and/or the recommendation service 210 responsive to the authentication credentials being valid.

The client device 205 may include one or more native applications 350 and/or a browser application 355. The one or more native applications 350 may include an application developed for use on the client device 205 and/or an application that may communicate with the application services 225a and 225b to enable users to consume, create, share, collaborate on, and/or modify electronic content. The browser application 355 may be an application for accessing and viewing web-based content. The application services 225a and 225b may provide a web application that enables users to consume, create, share, collaborate on, and/or modify content. A user of the client device 205 may access the web application and render a user interface for interacting with the application services 225a and 225b in the browser application 355. The application services 225a and 225b and/or the recommendation service 210 may support both the one or more web-enabled native applications 350 and one or more web applications 290, and the users may choose which approach best suits their needs. The recommendation service 210 may also provide support for the one or more native applications 350, the browser application 355, or both to provide functionality for a user of the client device 205 to obtain the services provided by the recommendation service 210.

Figure 3B:
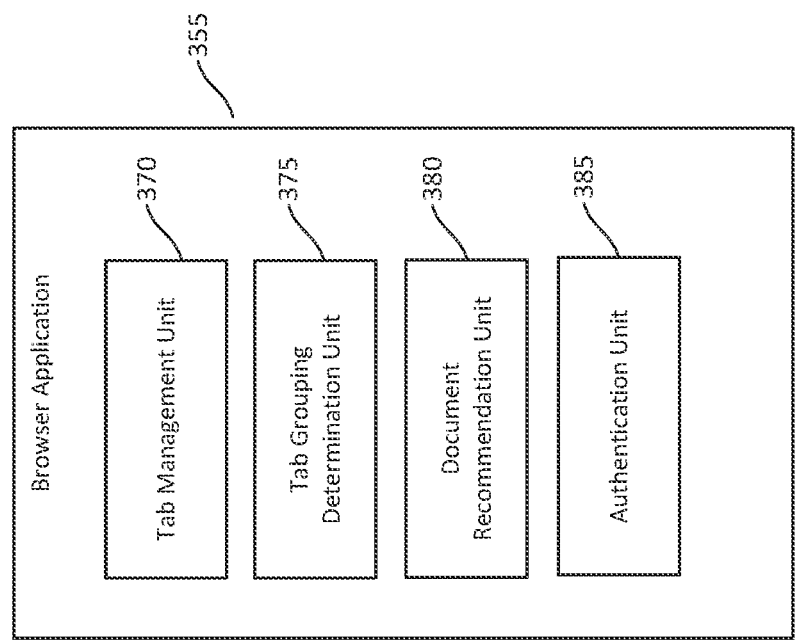

FIG. 3B is a diagram that shows an example implementation of the browser application 355 of the client device 205. The browser application 355 may include a tab management unit 370, a tab grouping determination unit 375, a document recommendation unit 380, and an authentication unit 385. The native application 350 may also implement similar elements as those shown in FIG. 3B.

The tab management unit 370 may be configured to manage the application-specific tab grouping functionality described herein. The tab management unit 370 may obtain an indication how to group the tabs of the tabbed user interface from the tab grouping determination unit 375 based on the content being accessed by the user. The tab management unit 370 may then determine whether there are any other tabs associated with the group indicated by the tab grouping determination unit 375 already being presented by the tabbed user interface and/or whether the tabbed interface is currently displaying tab group control element for application-specific groupings. The tab group control element is configured to provide controls for quickly and efficiently consuming and/or creating content associated with the application. The tab group control element may significantly improve the user experience in a tabbed application environment by providing functionality for automatically organizing tabs associated with the same application together. The tab group control element may also provide controls for creating new application specific content and/or for accessing existing application-specific content. The tab management unit 370 may automatically organize the tabs for multiple applications being accessed through the tabbed user interface into tab groups and may provide tab group control element for each of these applications. The tab management unit 370 may be configured to cause the browser application 355 or web-enabled native application 350 to render the application-specific tab control elements proximate to the tabs associated with the application to simplify navigation through the tabbed user interface by providing functionality associated with the application proximate to the tabs associated with the application. Examples of the tabbed user interface and the application-specific control element are provided in FIGS. 4A-4H and 5A-5G.

In some implementations, the tab management unit 370 is configured to prompt a user before grouping tabs. For example, the tab management unit 370 may be configured to present a query to the user: "We noticed that you have several tabs open associated with Application X? Should we group these tabs for you?" on the tabbed user interface. If the user responds affirmatively that the tabs should be grouped, the tab management unit 370 then groups the tabs into a tab group. In some implementations, the tab management unit 370 will prompt the user to approve or disapprove grouping of tabs for each application that is encountered in a particular browsing session. The tab management unit 370 may store information identifying the applications for which the user has approved automatic grouping in a user profile or other persistent data store. The tab management unit 370 may access this stored information across sessions using the browser application 355 or web-enabled native application 350.

The tab grouping determination unit 375 is configured to determine a grouping for a tab based on an application associated with the contents of the tab and/or other grouping criteria and to provide an indication of the grouping to the tab management unit 370. In some implementations, the tab grouping determination unit 375 is configured to organize tabs into application-specific tab groups by automatically identifying the application with which each tab is associated and grouping tabs by application. In other implementations, the tab grouping determination unit 375 uses other grouping criteria may be used in addition to or instead of the application, including but not limited to the subject matter or content associated with the tab or a particular project or task with which the content is associated. In implementations where criteria other than the application are used to determine the tab grouping, the tab grouping may include content from multiple applications.

In implementations where the tabs are grouped by application, the tab grouping determination unit 375 is configured to determine an application associated with content which has been accessed via a tab of the tabbed user interface provided by the browser application 355 or web-enabled native application 350 and provide an indication to the tab management unit 370 that the tab is to be added to an application-specific tab group. The tab grouping determination unit 375 may be configured to identify the application based on the URL. A user of the client device 205 may enter a URL in an address bar of the browser application 355 or the web-enabled native application 350. The user may also click on or otherwise activate a link in content being displayed in a tab of the tabbed user interface. In some implementations, the link may be displayed in another application or document, and the user may click on or otherwise activate the link to cause the browser application 355 to display the content associated with the URL in a tab. The URL may be associated with a particular web-based application or may be associated with an electronic document that is associated with the web-based application. The tab management unit 370 may be configured to analyze the URL to determine the application associated with the URL. The tab grouping determination unit 375 may also be configured to analyze the web-based content associated with the URL to determine an application associated with the URL. In some implementations, the web-based applications may be configured to include a tag that identifies the web-based application in the markup language provided by the application service 225 to the client device 205 for presenting the web-based application on the browser application 355. In other implementations, the tab grouping determination unit 375 is configured to analyze the contents of the webpage or other content shown in the content pane 195 using one or more machine learning models trained to analyze content and to predict an application or content type to recommend to the tab management unit 370 for grouping tabs.

In some implementations where the tabs are grouped by application, the tab grouping determination unit 375 is configured to identify a source application from which the content has been accessed for determining a tab group for the tab. For example, a user may receive links to files or files attached to an email. The user may activate the link or attachment for a file to view it in a tab of the tabbed user interface. The tab grouping determination unit 375 may indicate that the application is the user's email program in this instance, and the tab management unit 370 may present the files in an email program group. While this example is related to an email application, the tab grouping determination unit 375 may be implemented for other types of applications or content sources, such as but not limited to a messaging application, collaboration platform, or websites (e.g., SharePoint). This approach may improve the user workflow by grouping the electronic documents the user is working with together even if these documents are not associated with the same application or extension as in the preceding examples.

The tab grouping determination unit 375 is configured to group tabs based on the user's browsing history in some implementations. The application determination unit 273 may, for example, indicate that all tabs that originate from a particular web page should be grouped into a single tab group. The tab grouping determination unit 375 may provide the tab management unit 370 with a name or title of the web page in such implementations, and the tab management unit 370 may create a new tab group based on the name or title of the web page.

The tab grouping determination unit 375 is configured to group tabs associated with a particular project or task in some implementations. In such an implementation, the tab grouping determination unit 375 may utilize a machine learning model that is trained to analyze the activity of the user within the browser application and to recognize patterns in usage to predict that a particular tab is associated with a particular project or task. The machine learning model may analyze the browsing history of the user when making a prediction whether a particular tab is associated with a particular project or task. The tab grouping determination unit 375 may provide the tab management unit 370 with a name of the project or task for the tab group, and the tab management unit 370 may create a new tab group based on the name.

In some implementations, the tab grouping determination unit 375 is configured to determine an application associated with content which has been accessed via a tab of the tabbed user interface based on a file type associated with the content or an extension to the browser application browser application 355 or the web-enabled native application 350. For example, a tab may be opened to display a Scalable Vector Graphics (SVG) file. In this example, the electronic document being opened in the tab is not associated with a particular web-based application. In such an implementation, the tab grouping determination unit 375 may identify the SVG file as being associated with the SVG extension, and the tab management unit 370 may group tabs associated with this extension together. In another non-limiting example, a tab may be opened to display a Portable Document Format (PDF) file, which may be displayed in a tab of the browser using a browser extension configured to support rendering of PDF documents in a tab. Other types of documents may be associated with other types of extensions, and these documents may also be identified by the tab grouping determination unit 375 and grouped together by the tab management unit 370.

The browser application 355 and/or the web-enabled native application 350 provide a configuration user interface that enables the user to configure the how the tab grouping determination unit 375 groups tabs within the tabbed user interface in some implementations. The configuration user interface enables the user to turn automatic grouping on or off, to turn on or off automatically collapsing of tab groups that are not currently active, and/or other aspects of the functionality associated with the automatic tab grouping. The configuration user interface provides controls for selectively enabling or disabling the automatic grouping of tabs for specific types of grouping criteria. In a non-limiting example, the user may enable application-specific grouping but disable grouping by browsing history and by task or project. Furthermore, the configuration user interface may permit the user to rank the order in which the various grouping criteria applied by the tab grouping determination unit 375. In another non-limiting example, the user may determine that grouping by project or task is more important than ranking by application. The tab grouping determination unit 375 would first attempt to determine whether a tab is associated with a particular project or task and group the tab accordingly. If the tab grouping determination unit 375 is unable to determine a project or task, the tab grouping determination unit 375 then groups the tab by application.

Other possible configurations are possible depending upon the grouping criteria options that the user enables and how those grouping criteria are ranked by the user.

The document recommendation unit 380 may be configured to send requests to the application service 225 and/or the recommendation service 210 for content recommendations that may be presented to user in the application-specific tab group user interface element. The application service 225 may route the requests for the content recommendations to the recommendation service 210 for processing and may also route the recommendations provided by the recommendation service 210 to the client device 205. As discussed above with respect to the recommendation service 210, the recommendation service 210 may provide various types of recommendations, including but not limited to recently accessed documents, documents shared with the user, and/or other document recommendations.

The authentication unit 385 may provide functionality for verifying whether users are permitted to access the services and/or documents provided by the application service 225 and/or the recommendation service 210. The authentication unit 335 may provide functionality for receiving authentication credentials for the users from their respective client device 205. The authentication unit 335 may be configured to verify that the authentication credentials are valid and permit the users to access the services and/or documents provided by the application service 225 and/or the recommendation service 210 responsive to the authentication credentials being valid. In some implementations, the user may be authenticated by the application service 225 and the authentication unit 385 may obtain an authentication token or other functionality for authenticating the user with the application service 225 and/or the recommendation service 210.

FIGS. 4A, 4B, 4C, 4D, 4E, 4F, 4G, and 4H show an example of a horizontal tabbed user interface 405 that may be implemented according to the techniques described herein. In the examples shown in FIGS. 4A, 4B, 4C, 4D, 4E, 4F, 4G, and 4H, the tabs are grouped according to application, but other grouping criteria could be used in other implementations. The example user interface 405 shown in FIGS. 4A, 4B, 4C, 4D, 4E, 4F, 4G, and 4H is similar to the user interface 105 shown in FIG. 1. The user interface 405 may be generated by the tab management unit 370 of the browser application 355 of the client device 205. The user interface 405 may include an address bar 490 that may be used to enter a URL for a document or web-based application and/or display the URL associated with content being displayed in a currently selected tab 410*b* of the tabbed user interface 405. The user interface 405 also includes a content pane 495 in which first content associated with the active tab 410*b* is displayed. A second tab 410*a* associated with second content is also shown in the tabbed user interface 405 of FIG. 4A. The second content is not visible because the second tab 410*a* is not currently the active tab. The user interface 405 also includes a new tab control 420, which when activated, may be used to cause the browser application 355 or web-enabled native application 350 to display a new blank tab.

Figure 4A:
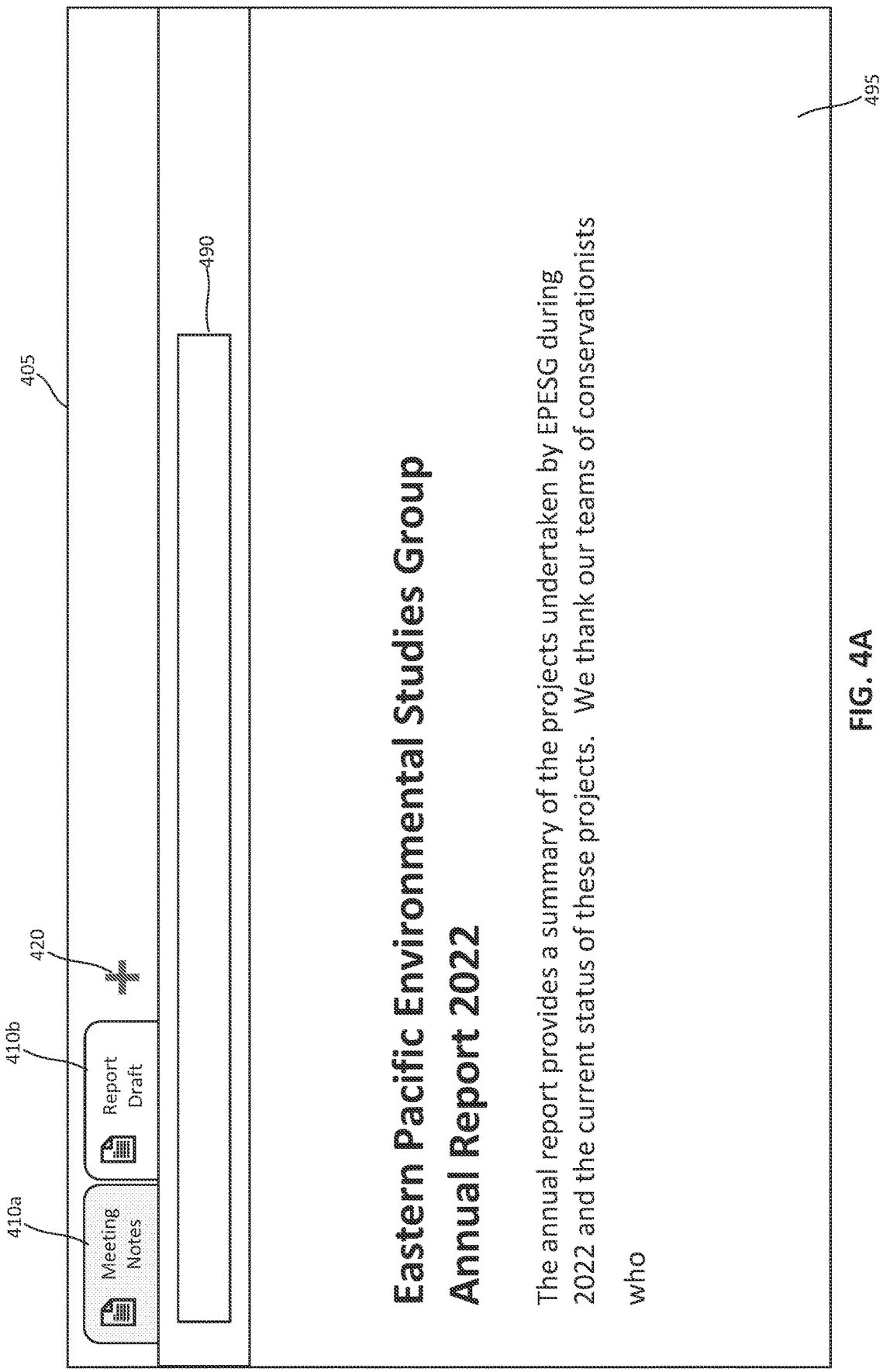
FIGS. 4A, 4B, 4C, 4D, 4E, 4F, 4G, and 4H show an example tabbed user interface that may be implemented according to the techniques described herein.
Figure 4B:
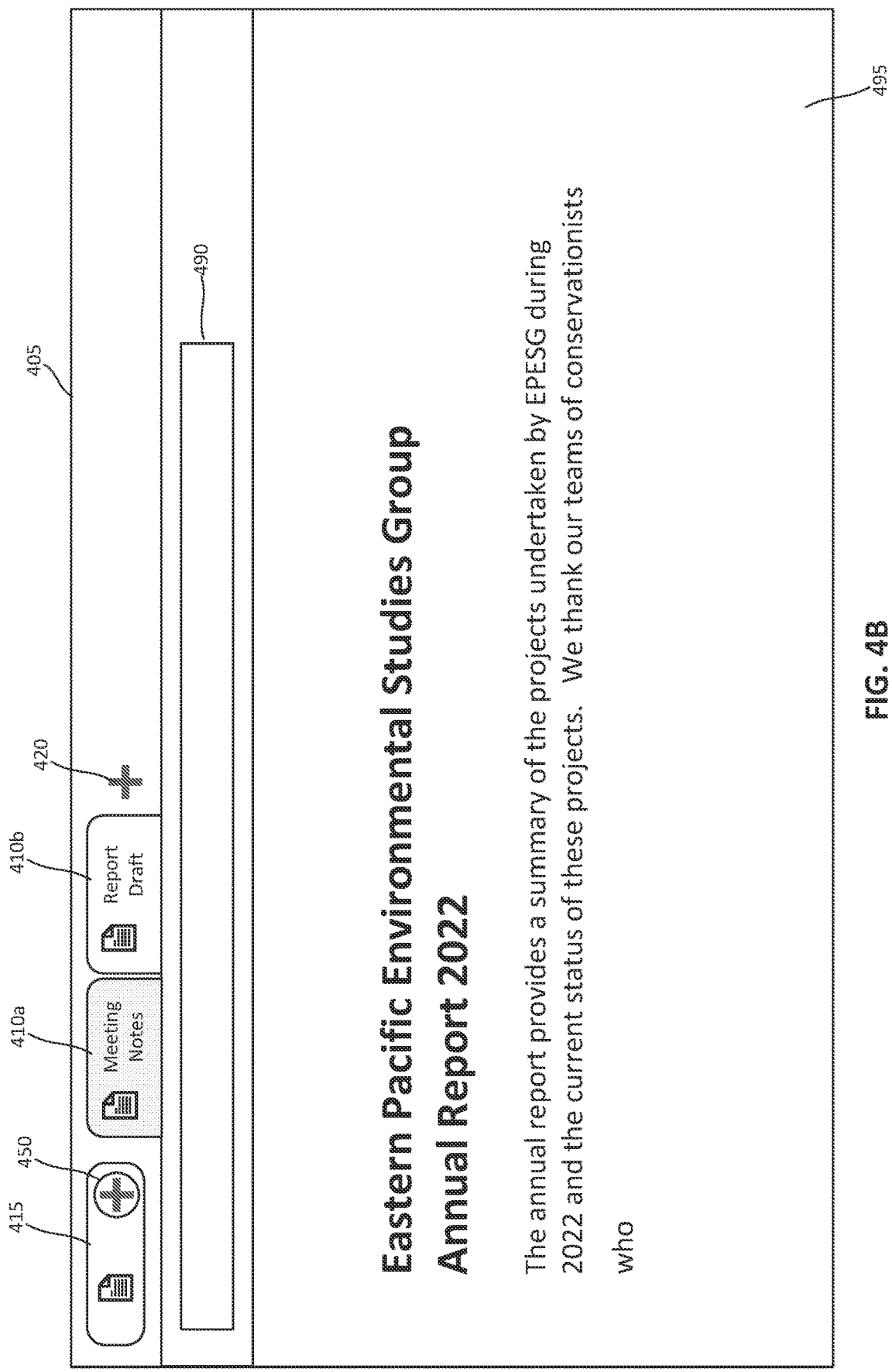

FIG. 4B shows an example of the user interface 405 in which a tab group control element 415 has been added. In some implementations, the user interface 405 displays the tab group control element 415 in response to one or more tabs associated with the application being opened. In other implementations, the user interface 405 displays the tab group control element 415 in response to more than one tab associated with the application being opened. The tab management unit 370 may determine that a new tab has been opened or that the content displayed in an open tab has changed and request an indication of the application associated with the tab from the tab grouping determination unit 375.

The tab group control element 415 may be added by the tab management unit 370. The tab group control element 415 is grouped with the tabs 410*a* and 410*b* which are being used to access documents using the same web-based word processing program provided by the application service 225*a* or 225*b*. The tab management unit 370 may determine that the tabs 410*a* and 410*b* are associated with the same web-based application and group the tabs together on the tabbed user interface. The tab management unit 370 may also be configured to cause the tab group control element 415 to be displayed proximate to the group of tabs. A non-limiting technical benefit of this approach is that the user experience may be improved by simplifying navigation of the tabs of the tabbed user interface 405 by grouping tabs associated with the same web-based application together and providing application-specific tools in the tab group control element 415 proximate to the group of tabs on the tab bar of the tabbed user interface 405. This approach places the controls associated with each application next to the group of tabs associated with that application so that the user does not need to locate and navigate through multiple menus associated with the web-based application to perform the actions provide by the application-specific tools in the tab group control element 415. Thus, the tab group control element 415 provides improved human-computer interaction with the web-based application. While the example shown in FIG. 4B includes two tabs, the tab group control element 415 may be associated with a single tab or more than the two tabs shown in FIG. 4B.

The tab group control element 415 may include an icon, logo, or other representation of the application associated with the group of tabs so that a user may readily discern that the tab group control element 415 is associated with a particular web-based application. Other implementations may include text description and/or utilize a color scheme associated with the application in addition to or instead of the icon to associate the tab group control element 415. The tab group control element 415 may also include a new tab control 450 similar to the new tab control 420 for opening a new tab. The tab group control element 415 is configured to automatically open a new tab specific to the web-based application and to automatically add the tab to the tab group. Automatically, as used herein, refers to the grouping of the tabs being performed by the tab management unit 370 in response to the new tab being opened (e.g., without requiring manual user action). The tab group control element 415 may cause a default start page for the application to be loaded in the newly created tab. Furthermore, the tab group control element 415 may cause a new electronic document to be opened in the new tab rather than navigating to a default start page. In a non-limiting example, if the application associated with the tab group control element 415 is a word processing application, the tab group control element 415 may cause a new tab to be opened that presents a new word processing document.

Figure 4C:
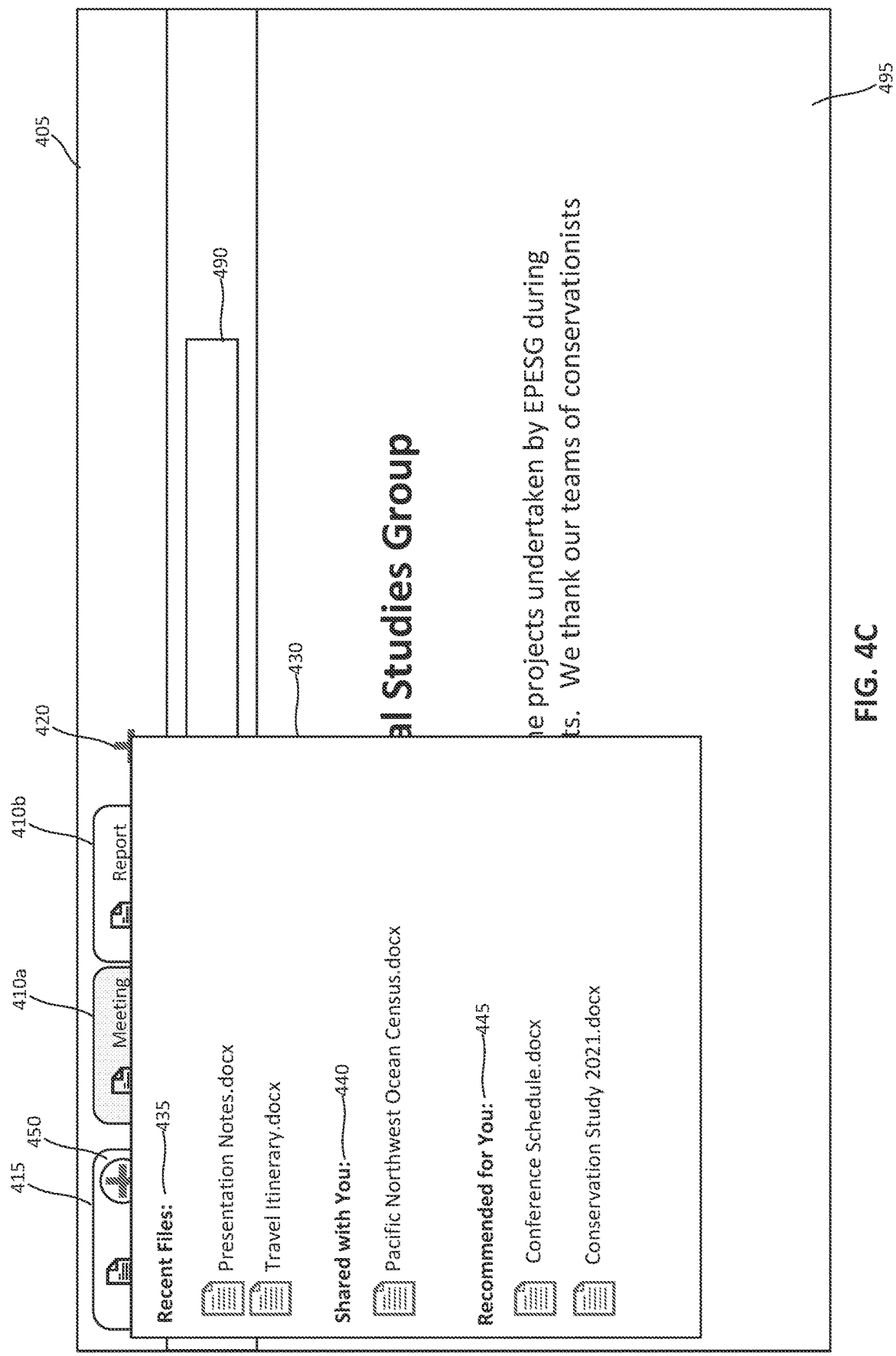

FIG. 4C shows an example of the user interface 405 in which the user has activated the tab group control element 415. The user may activate the tab group control element 415 by clicking on or touching the tab group control element 415, hovering a pointer or cursor over the tab group control element 415, and/or otherwise providing input for activating the tab group control element 415. In some implementations, the user may activate the tab control element 415 using a voice command. For example, the user may speak the command: "New [APP] tab?" where "[APP]" represents the name of an application for which the new tab is to be opened.

In the example shown in FIG. 4C, activating the tab group control element 415 causes the tab group control pane 430 to be displayed on the user interface 405. The tab group control pane 430 in this example presents a recently accessed files list 435, a list of files that have been shared with the user by other users 440, and a list of file recommendations 445, which may be obtained from the recommendation service 210. The files presented on the tab group control pane 465 are files that have been created using the word processing application or are files for which the word processing application may be used to view and/or modify the files. The user may click on or otherwise select a file to cause that file to be opened in a new tab on the user interface 405. Upon opening, the new tab is grouped with the tabs 410a and 410b, as all the tabs are associated with the word processing application.

Figure 4D:
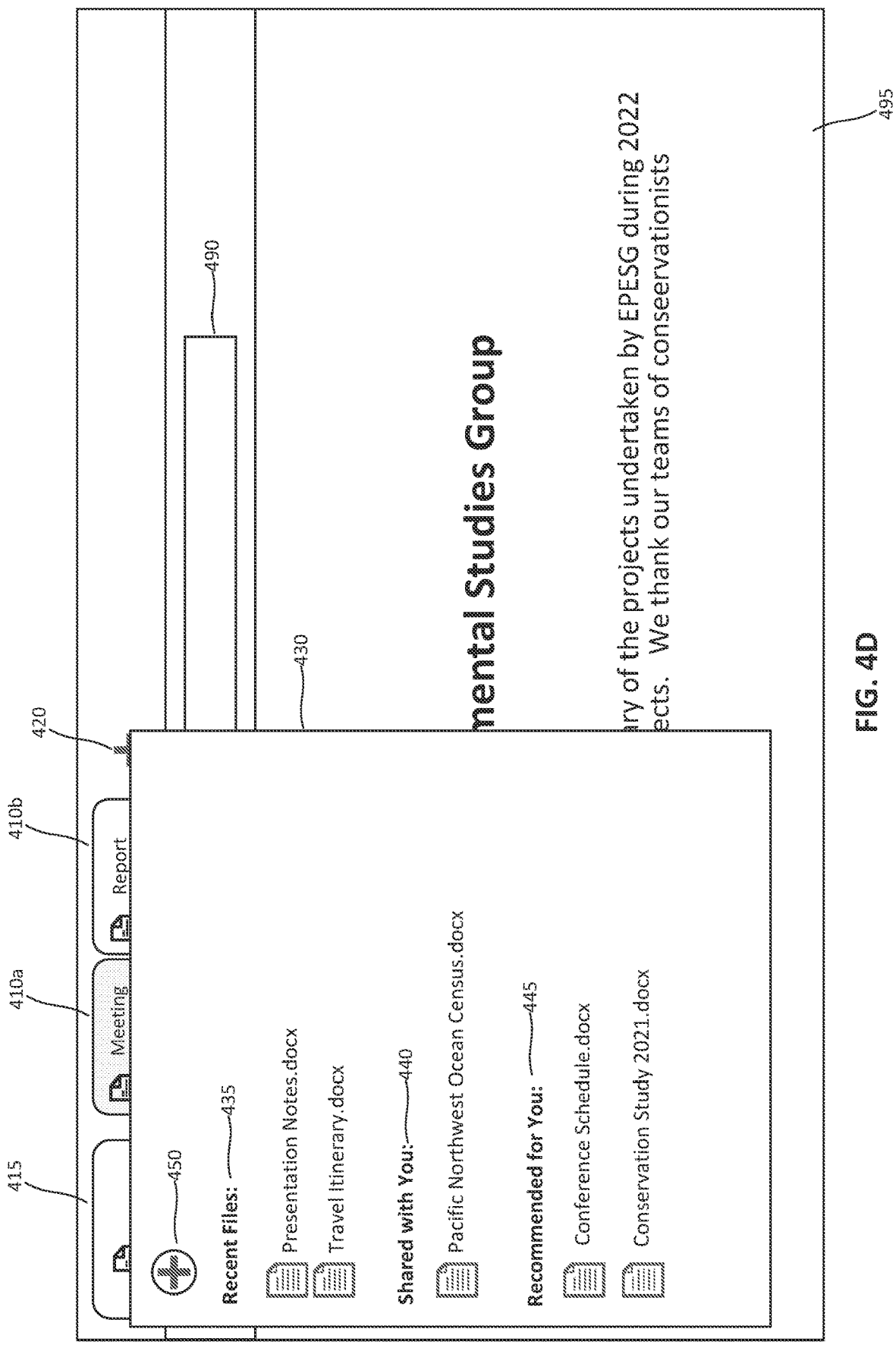

FIG. 4D shows an example of an alternative configuration of the user interface 405 in which the tab group control element 415 does not include the new tab control 450, and the new tab control 450 is instead included on the tab group control pane 430. Other configurations of the tab group control pane 430 and the tab group control element 415 are also possible.

Figure 4E:
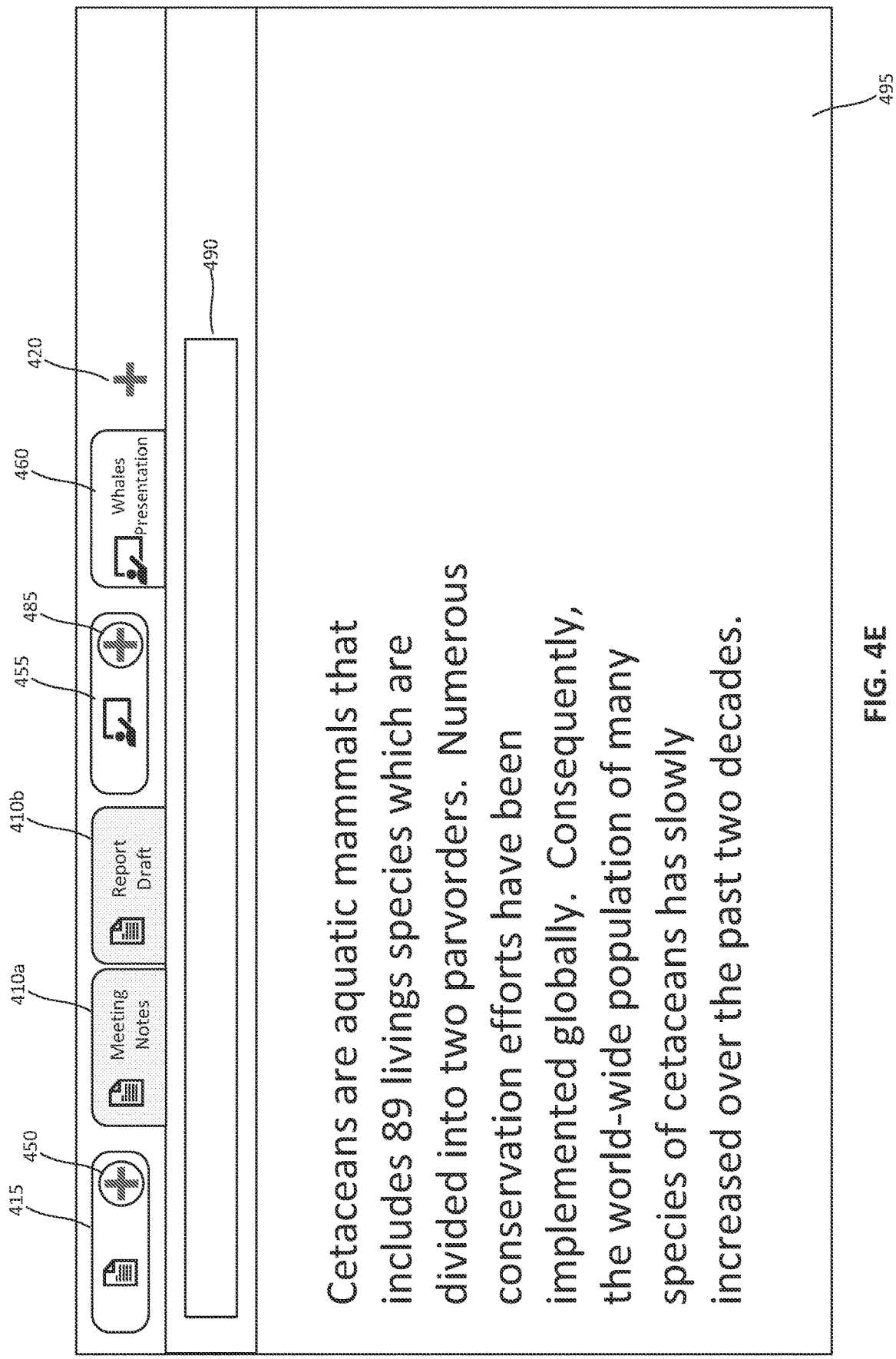

FIG. 4E shows an example of the user interface 405 in which a tab 460 for a second application has been opened. The tab 460 is associated with a presentation application provided by the application service 225a or the application service 225b. The tab management unit 370 of the browser application 355 of the client device 205 has identified the application and added a tab group control element 455 associated with the presentation application. The tab group control element 455 has been placed proximate to the tab 460 associated with the presentation application. The tab group control element 455 includes an icon representing the presentation application. Other implementations may include text description and/or utilize a color scheme associated with the presentation application in addition to or instead of the icon. The tab group control element 455 includes a new tab control 485 similar to the new tab control 450 provided by the tab group control element 415. The new tab control 485 may be used to open a new tab associated with the presentation application on the tabbed user interface 405. The new tab would be grouped with the tab 460 which is associated with the presentation application.

Figure 4F:
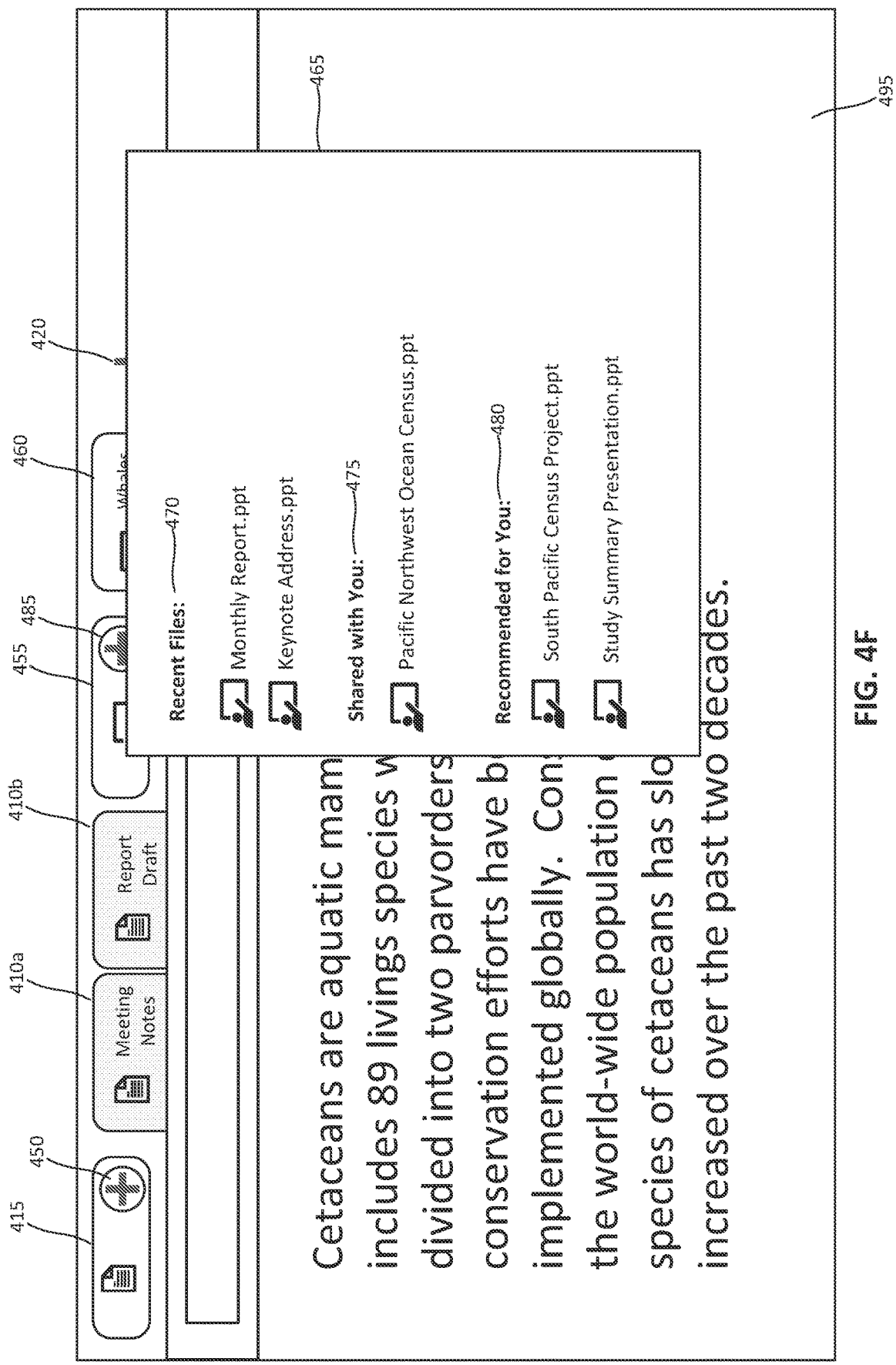

FIG. 4F shows an example of the user interface 405 in which the user has activated the tab group control element 455. The user may activate the tab group control element 455 by clicking on or touching the tab group control element 455, hovering a pointer or cursor over the tab group control element 455, and/or otherwise activating the tab group control element 455. The user may activate the tab group control element 455 using a voice command.

In this example, activating the tab group control element 455 causes the tab group control pane 465 to be displayed on the user interface 405. The tab group control pane 465 presents a recently accessed files list 470, a list of files that have been shared with the user by other users 475, and a list of file recommendations 480, which may be obtained from the recommendation service 210. The files presented on the tab group control pane 465 are files that have been created using the presentation application or are files for which the presentation application may be used to view and/or modify the files. The user may click on or otherwise select a file to cause that file to be opened in a new tab on the user interface 405. The new tab would be grouped with the tab 460 which is associated with the presentation application.

Figure 4G:
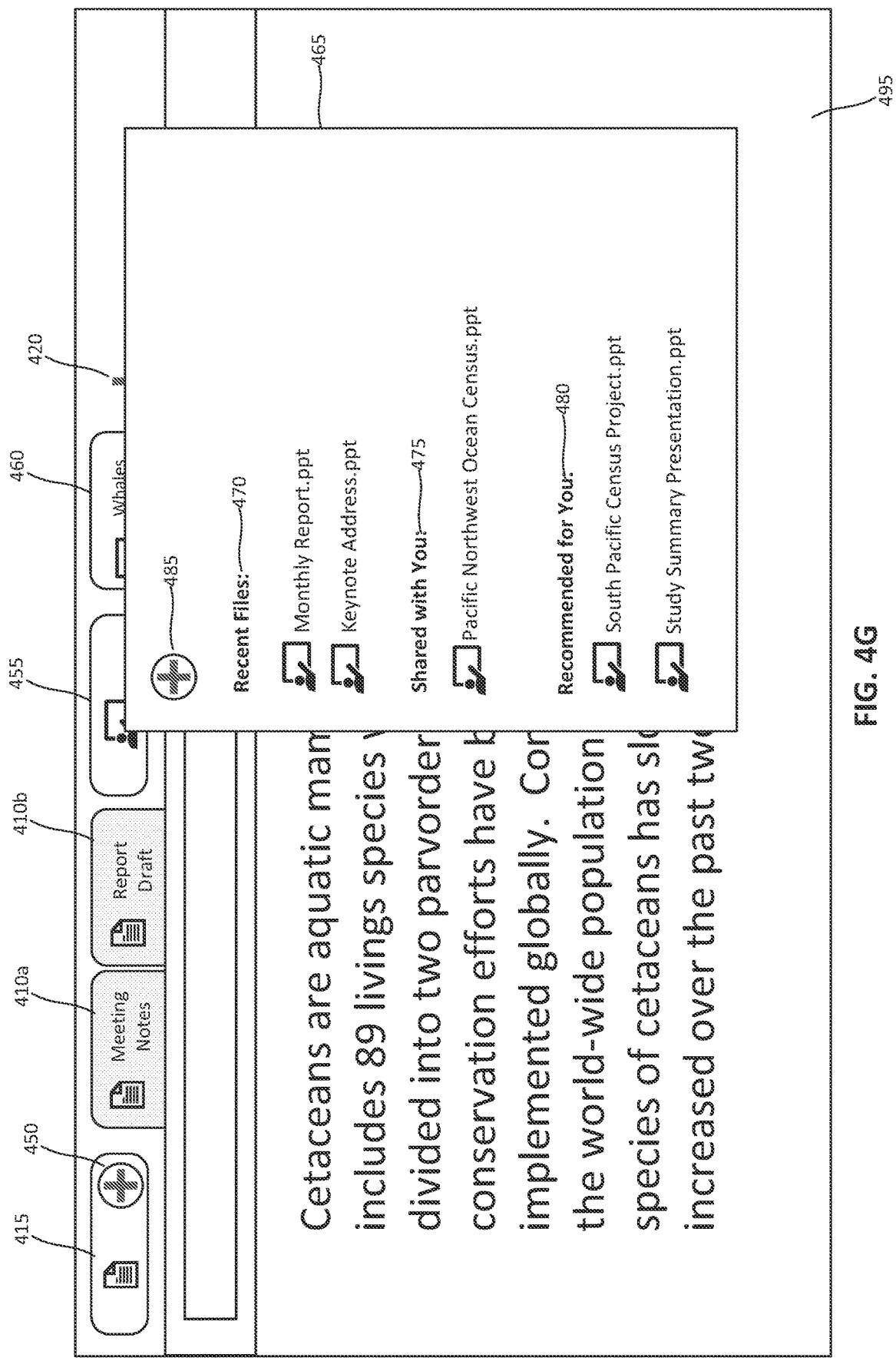

FIG. 4G shows an example of an alternative configuration of the user interface 405 in which the tab group control element 455 does not include the new tab control 485, and the new tab control 485 is instead included on the tab group control pane 465. Other configurations of the tab group control pane 465 and the tab group control element 460 are also possible.

Figure 4H:
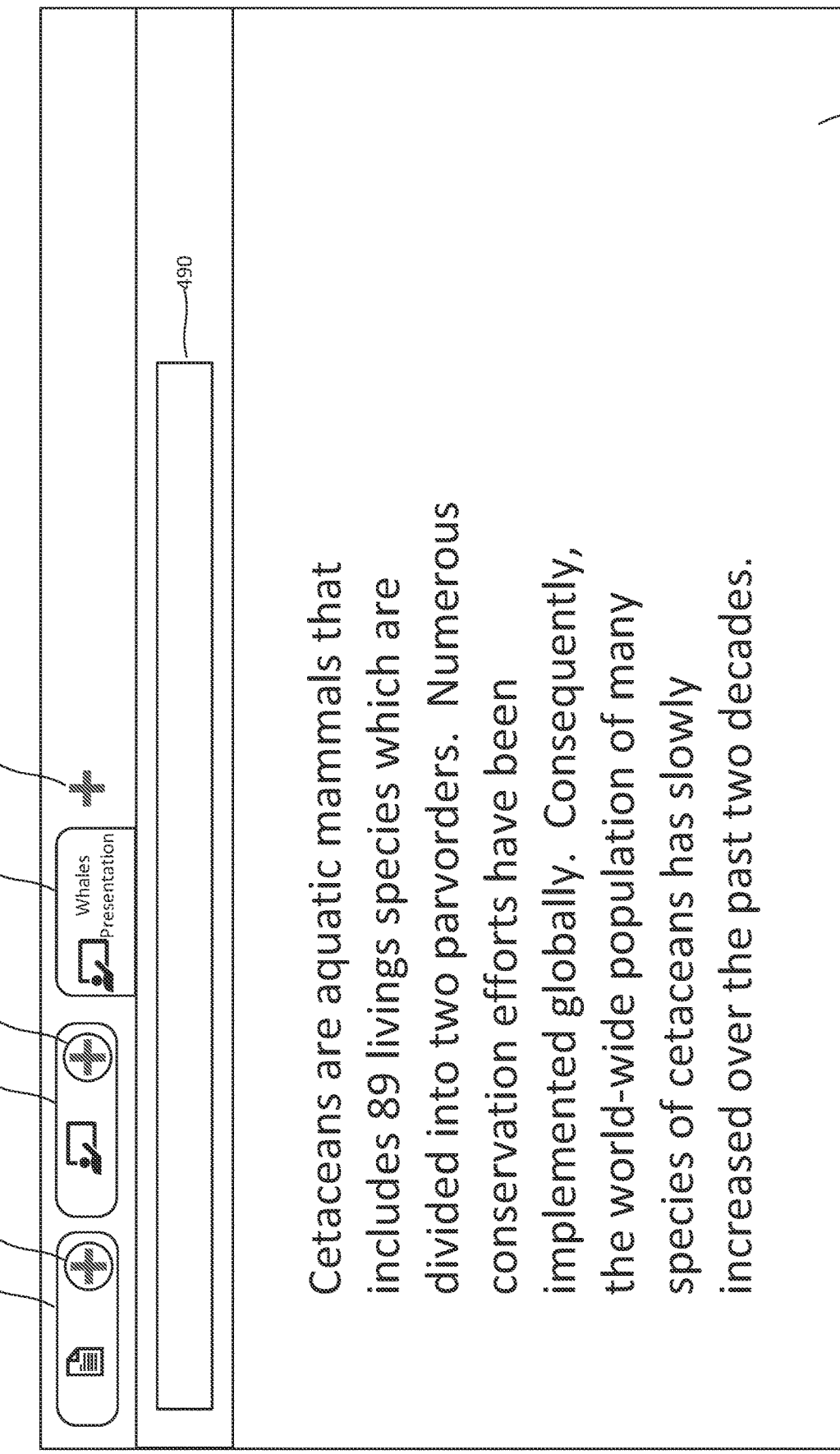

FIG. 4H shows an example of the user interface 405 in which the tab management unit 370 is configured to hide the tabs associated with tab groups that are not currently active in order to reduce visual clutter on the screen and make the user interface 405 easier to navigate for users. This approach may also boost user productivity by providing an easy entry point for launching a new web-based application within the tab group from the tab bar of the user interface 405. Thus, the tab management unit 370 provides improved human-computer interaction with the user interface 405. In this example, the tab 460 associated with the presentation application has been selected and is active. The content associated with tab 460 is visible in the content pane 495. The tab management unit 370 may automatically collapse the tabs associated with tab groups which are not currently active. In a non-limiting example, the user may navigate away from a tab group by selecting a tab that is not associated with the currently active tab group or creating a new tab that is not associated with the currently active tab group. The tab management unit 370 may then classify what was previously the currently active tab group as inactive and hide the tab group. Alternatively, the tab management unit 370 may be configured to collapse a group of tabs in response to the user clicking on or otherwise activating the tab group control element associated with the group of tabs.

The tab management unit 370 may be configured to show the hidden tabs in response to the user activating the tab group control element associated with the group of tabs that the user would like to expand. In some implementations, the tab management unit 370 may be configured to temporarily show the tabs that are hidden if the user hovers a pointer or cursor over the tab group control element rather than the group control pane. If the user were to click on the tab group control element 415, the hidden tabs 410a and 410b would be unhidden. In this implementation, the presence of the tab group control element 415 indicates the presence of the hidden tabs 410a and 415b. The tab group control element 415 would no longer be displayed if the tabs 410a and 415b were closed and no longer open but hidden. Alternatively, if the user were to hover the pointer or cursor over the tab group control element 415 while the group of tabs is collapsed, the hidden tabs 410a and 410b would be temporarily shown while the pointer or cursor continues to hover over the tab group control element 415. A non-limiting technical benefit of this approach is that hiding groups of tabs that the user is not actively using reduces the visual clutter of numerous tabs being concurrently displayed on the tabbed user interface 405 while enabling the user to quickly view and/or access hidden tabs as needed.

FIGS. 5A, 5B, 5C, 5D, 5E, 5F, and 5G show an example of a vertical tabbed user interface 505 that may be implemented according to the techniques described herein. The user interface includes a content pane 595 similar to the content pane 495 and an address bar 590 similar to the address bar 490 shown in FIGS. 4A-4H. In the examples shown in FIGS. 5B, 5C, 5D, 5E, 5F, and 5G, the tabs are grouped according to application, but other grouping criteria could be used in other implementations.

Figure 5A:
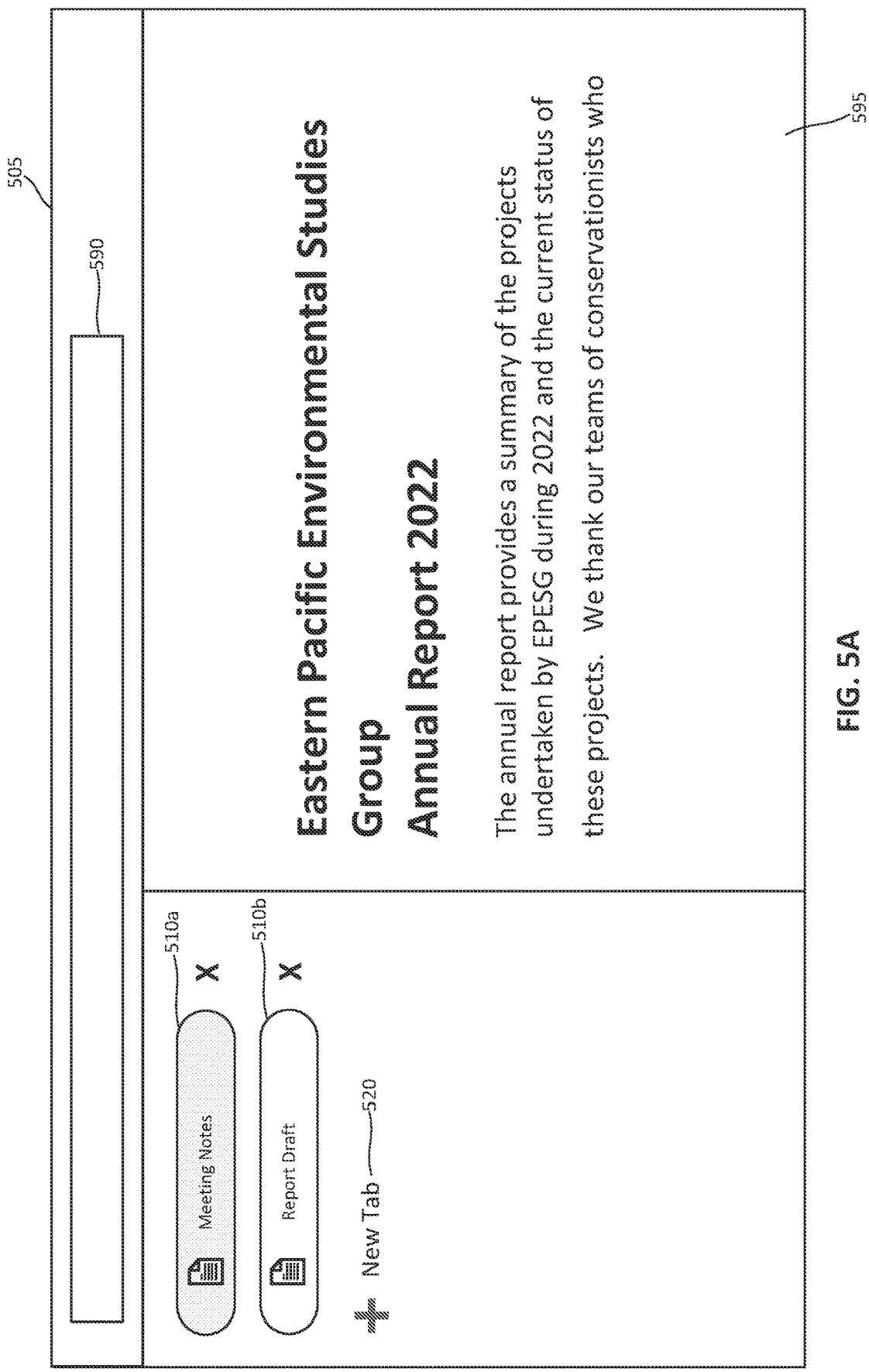
FIGS. 5A, 5B, 5C, 5D, 5E, 5F, and 5G show another example tabbed user interface that may be implemented according to the techniques described herein.
Figure 5B:
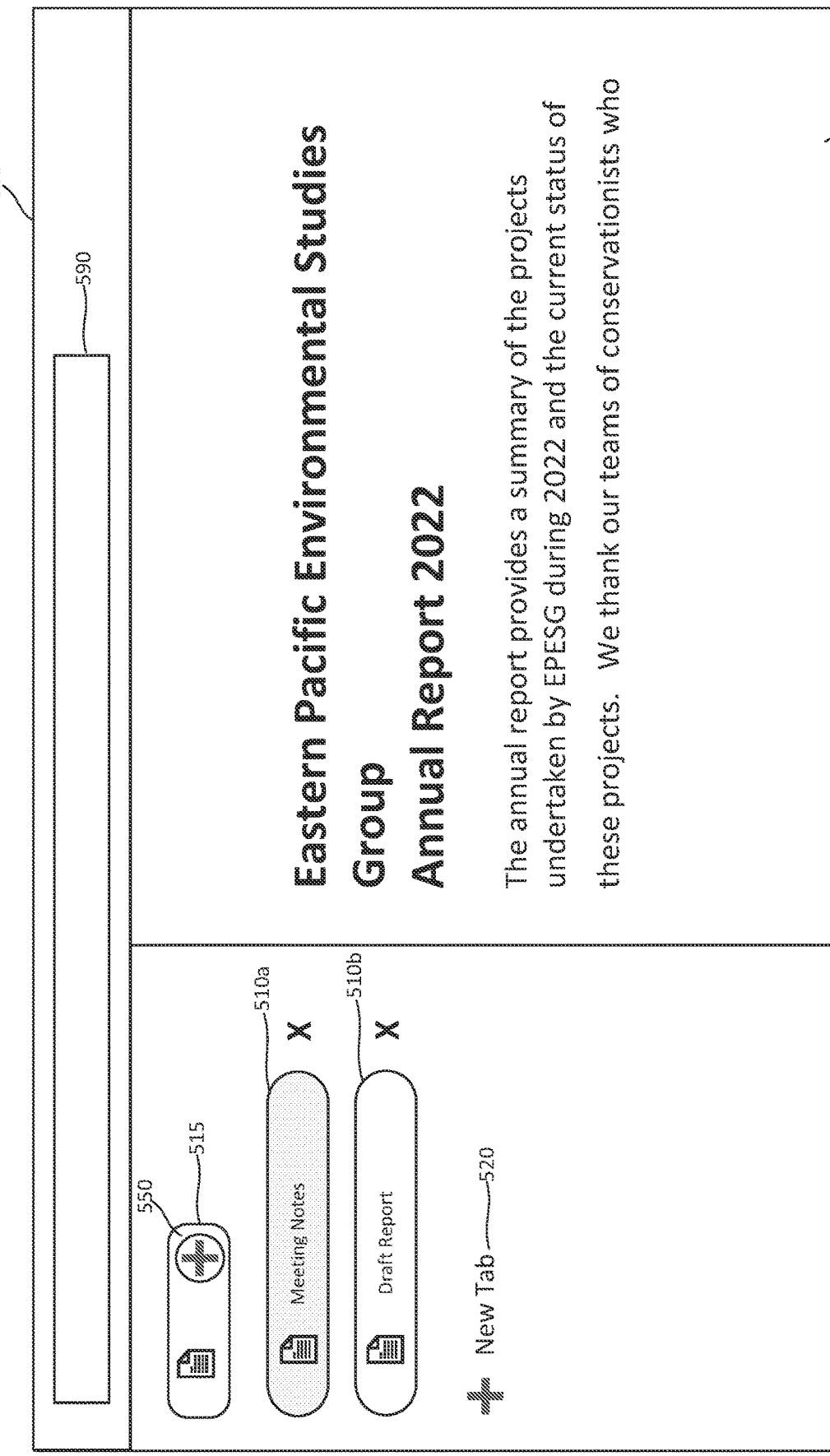

FIG. 5A shows a vertical rather than horizontal configuration for the tabs in which tabs 510a and 510b are aligned vertically along an edge of the user interface 505. Tabs 510a and 510b are similar to the tabs 410a and 410b shown in FIG. 4A. FIG. 5B shows the tab group control element 515 similar to the tab group control element 415 shown in FIG. 4B. The tab group control element 515 is presented proximate to the tabs 510a and 510b with which the tab group control element 515 is associated. In the example implementation shown in FIG. 5B, the tab group control element 515 is shown positioned above the tabs 510a and 510b, but the tab group control element 515 may be placed below the tabs of the group or in another position proximate to the tabs of the group.

Figure 5C:
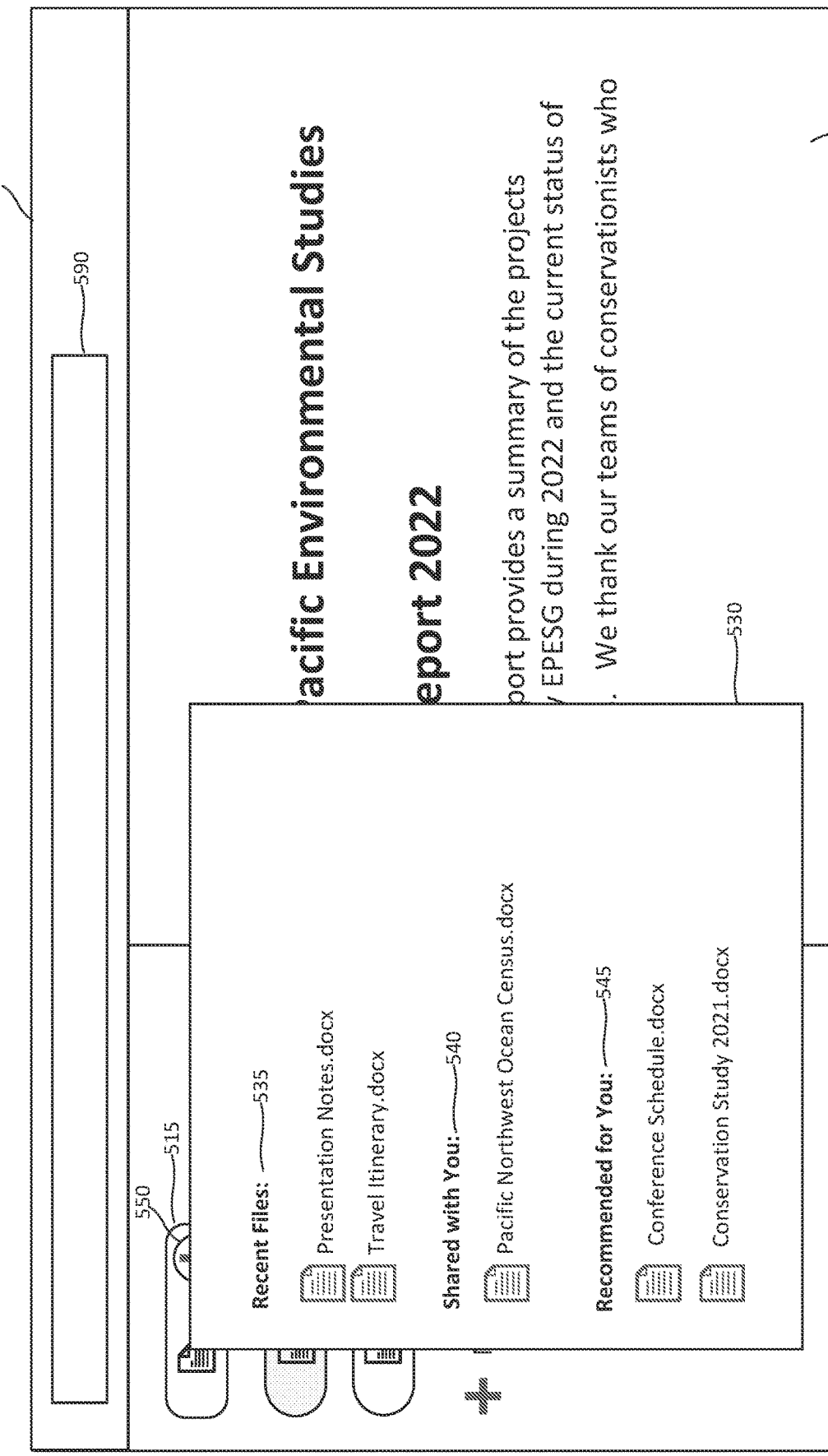

FIG. 5C shows an example of the user interface 505 in which the user has activated the tab group control element 515. The tab group control element 515 may function similarly to the tab group control element 515 and display a tab group control pane 530 when activated. The user may activate the tab group control element 515 by clicking on or touching the tab group control element 515, hovering a pointer or cursor over the tab group control element 515, issuing a voice command, and/or otherwise providing input for activating the tab group control element 515. The tab group control pane 530 may present recently accessed files list 535, a list of files that have been shared with the user by other users 540, and a list of file recommendations 545, which may be obtained from the recommendation service 210. The files presented on the tab group control pane 530 are files that have been created using the world processing application or are files for which the word processing application may be used to view and/or modify the files. The user may click on or otherwise select a file to cause that file to be opened in a new tab on the user interface 405. The new tab would be grouped with the tabs 510a and 510b which are both associated with the word processing application.

Figure 5D:
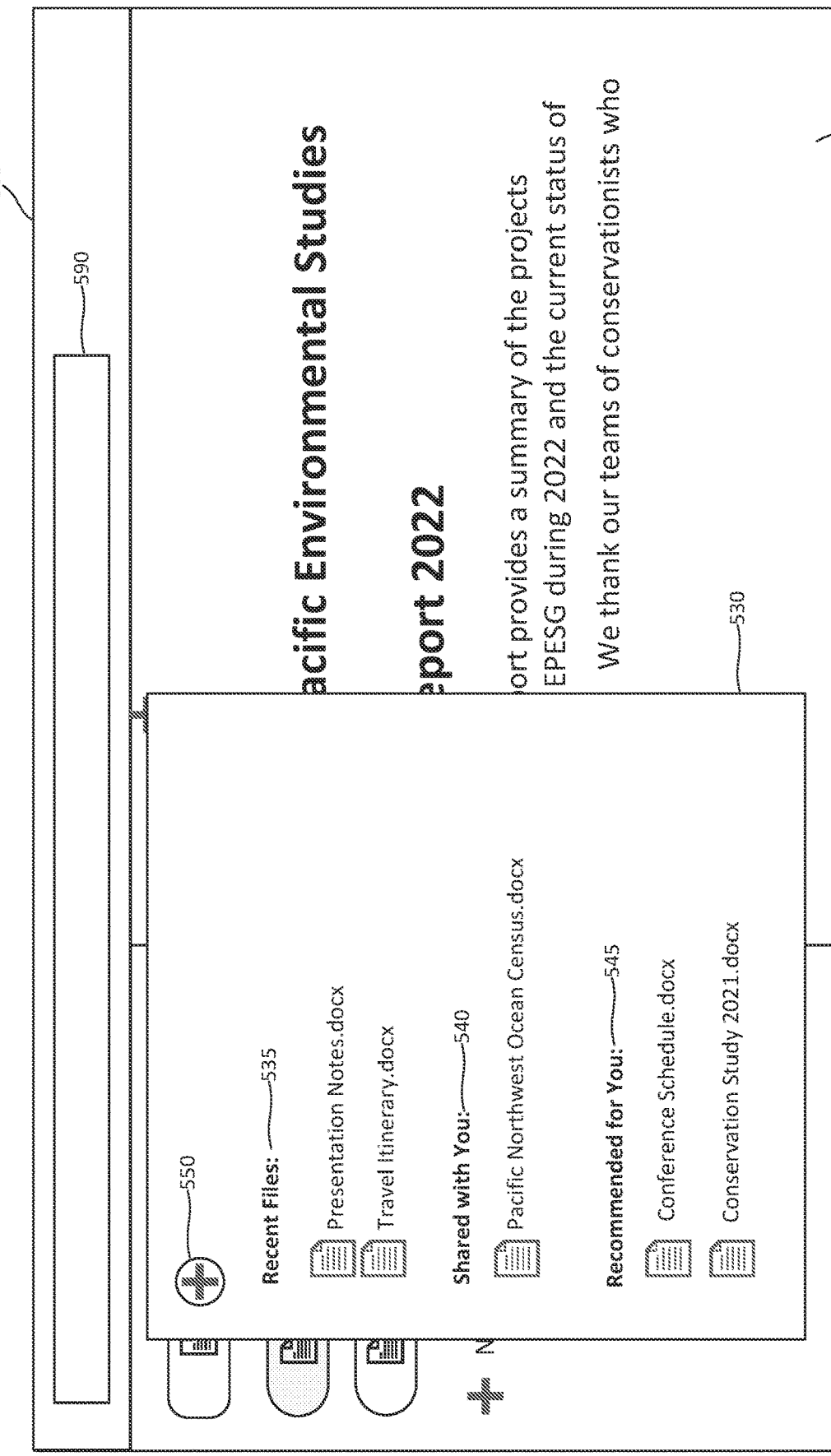

FIG. 5D shows an example of an alternative configuration of the user interface 505 in which the tab group control element 515 does not include the new tab control 450, and the new tab control 450 is instead included on the tab group control pane 530. Other configurations of the tab group control pane 530 and the tab group control element 415 are also possible.

Figure 5E:
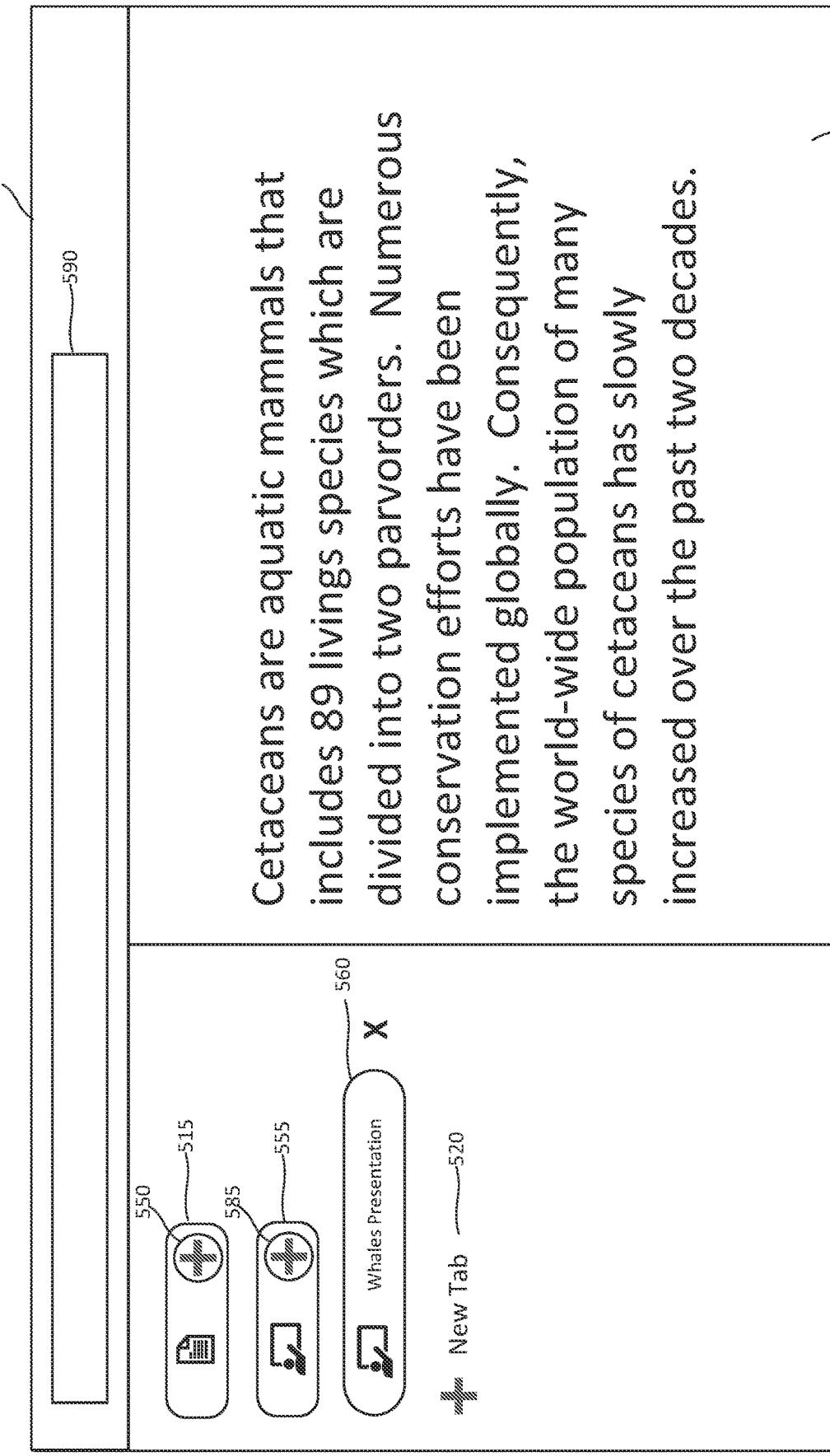

FIG. 5E shows an example of the user interface 505 in which the second application has been opened. The tab 560 is associated with the presentation application provided by the application service 225a or the application service 225b. The tab management unit 370 of the browser application 355 of the client device 205 has identified the application and added a tab group control element 555 associated with the presentation application. The tab group control element 555 has been placed proximate to the tab 460 associated with the presentation application. The tab group control element 555 includes an icon representing the presentation application. Other implementations may include text description and/or utilize a color scheme associated with the presentation application in addition to or instead of the icon. The tab group control element 555 includes a new tab control 585 similar to the new tab control 485. The new tab control 485 may be used to open a new tab associated with the presentation application on the user interface 405. The new tab would be grouped with the tab 560 which is associated with the presentation application.

The tabs 510a and 510b associated with the tab group control element 515 have also been hidden in the example shown in FIG. 5E. The tabs 510a and 510b may be revealed by clicking on or touching the tab group control element 515, hovering a pointer or cursor over the tab group control element 515, issuing a voice command, and/or otherwise providing input for activating the tab group control element 515 in a manner similar to that of tab group control element 415 discussed in the preceding examples. The tab management unit 370 may automatically hide groups of tabs that are not currently active in the vertical tabbed user interface 505 in a similar manner as the tabs shown in the horizontal tabbed user interface 405.

Figure 5F:
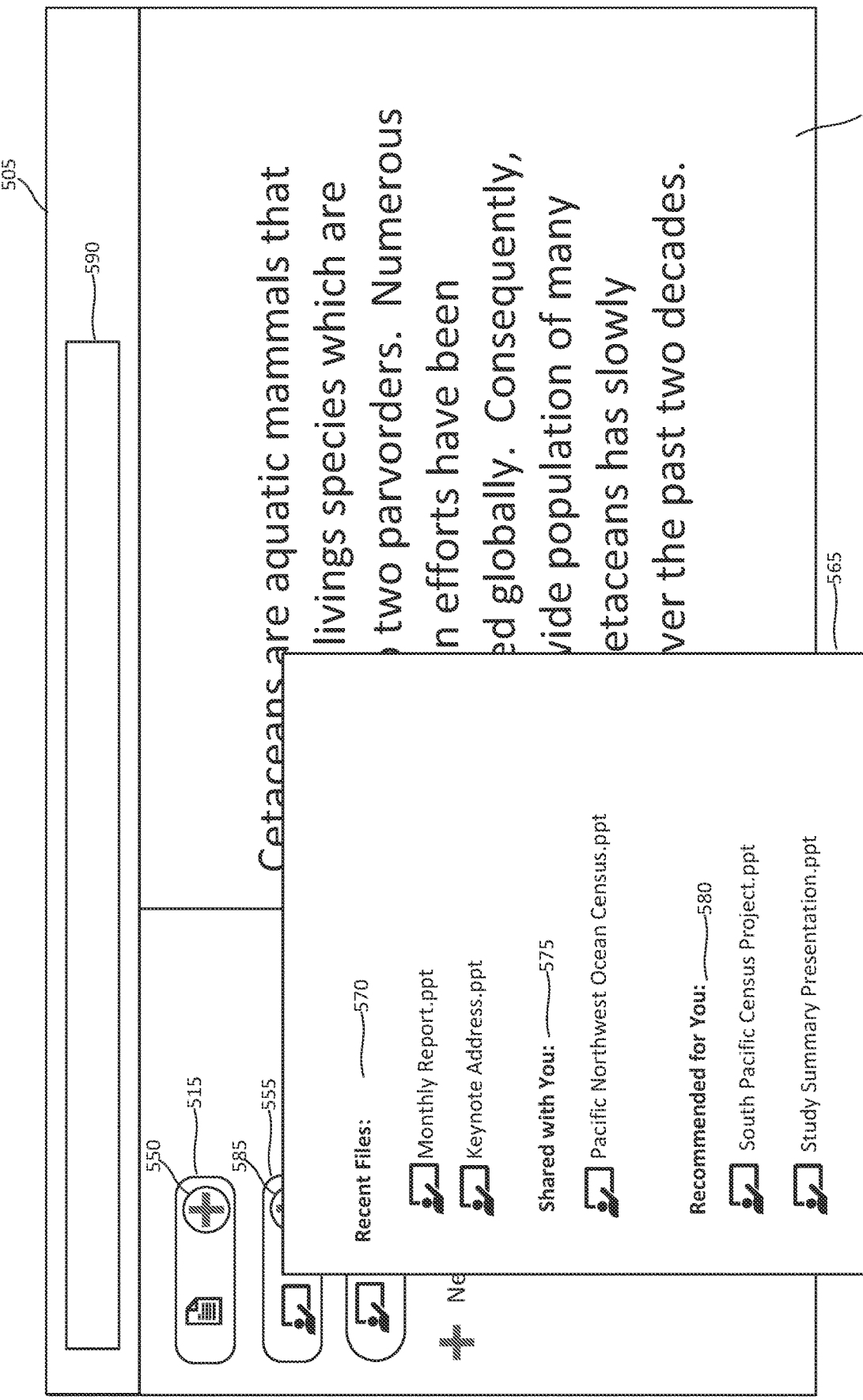

FIG. 5F shows an example of the user interface 505 in which the user has activated the tab group control element 555. The user may activate the tab group control element 555 by clicking on the tab group control element 555, hovering a pointer or cursor over the tab group control element 555, and/or otherwise activating the tab group control element 555. In this example, activating the tab group control element 555 causes the tab group control pane 565 to be displayed on the user interface 505. The tab group control pane 565 presents a recently accessed files list 570, a list of files that have been shared with the user by other users 575, and a list of file recommendations 580, which may be obtained from the recommendation service 210. The files presented on the tab group control pane 565 are files that have been created using the presentation application or are files for which the presentation application may be used to view and/or modify the files. The user may click on or otherwise select a file to cause that file to be opened in a new tab on the user interface 505. The new tab would be grouped with the tab 560 which is associated with the presentation application.

Figure 5G:
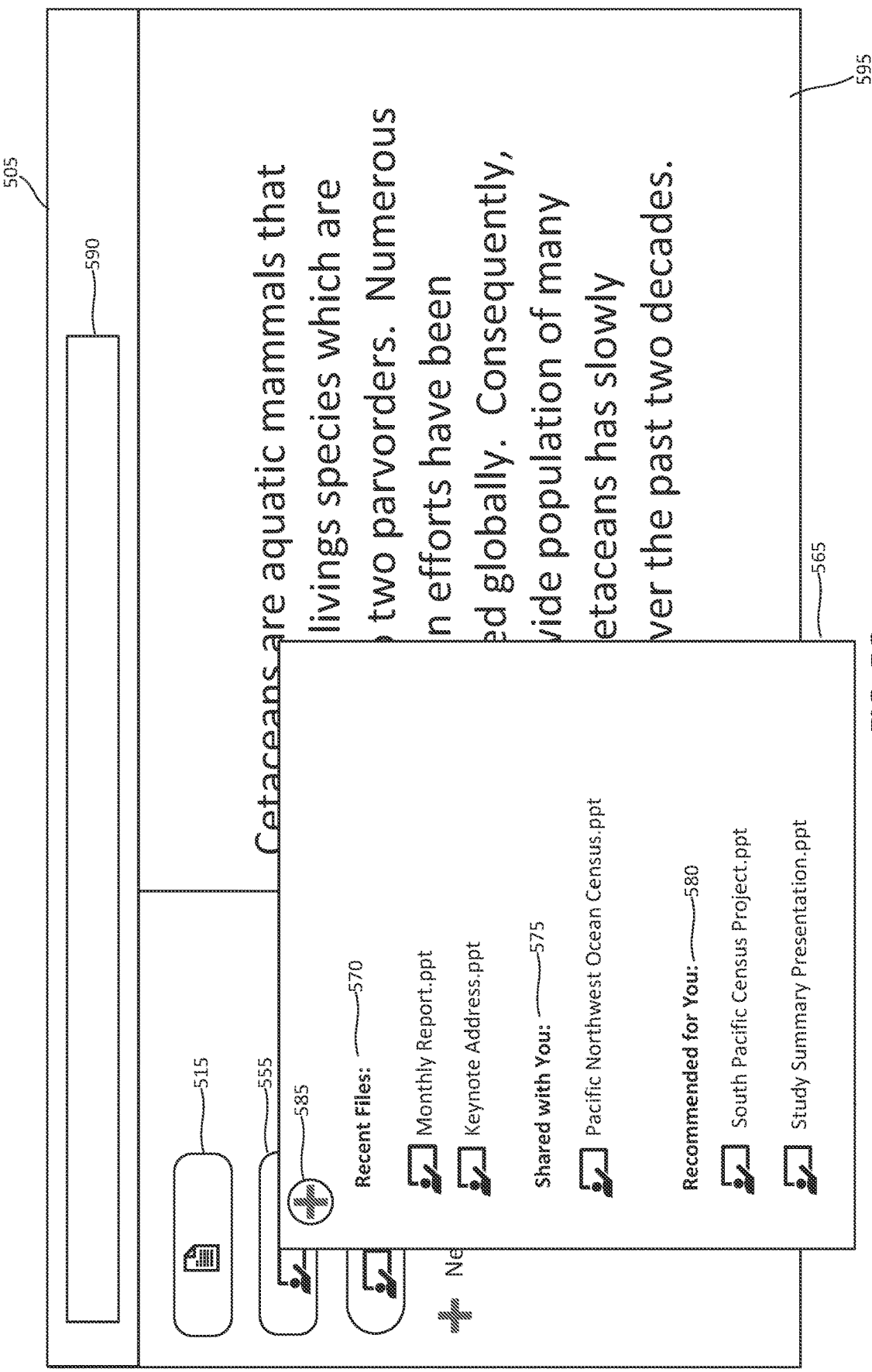

FIG. 5G shows an example of an alternative configuration of the user interface 505 in which the tab group control element 555 does not include the new tab control 585, and the new tab control 585 is instead included on the tab group control pane 565. Other configurations of the tab group control pane 565 and the tab group control element 560 are also possible.

Figure 6:
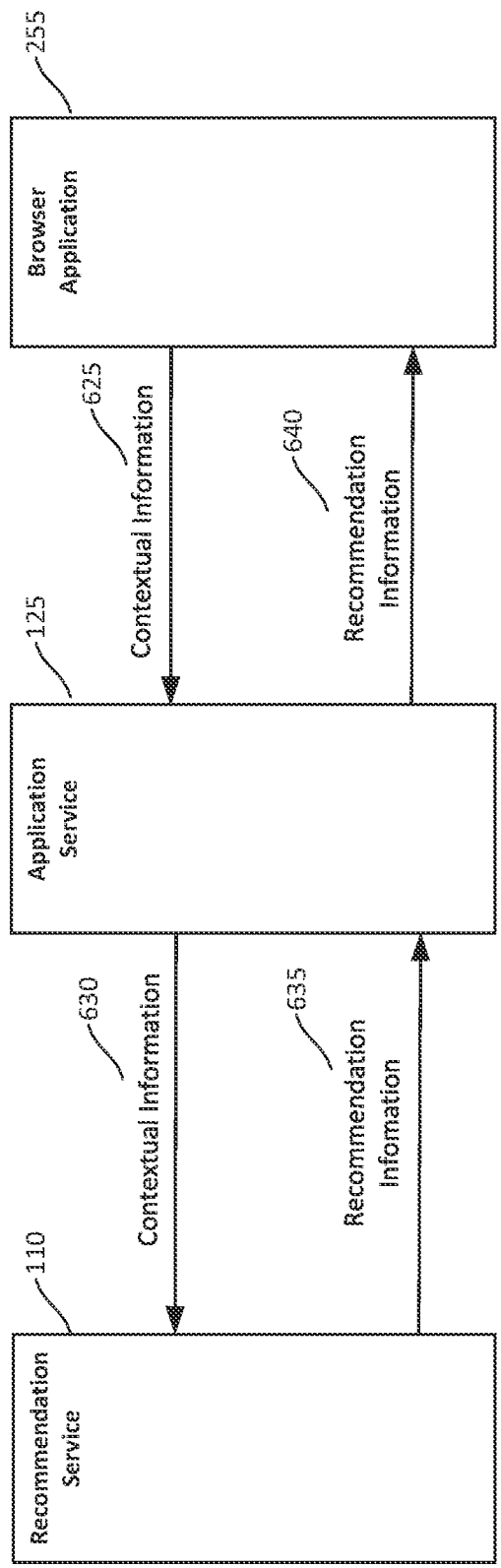
FIG. 6 is a diagram showing an example of information that may be exchanged among the recommendation service, the application service, and the browser application.

FIG. 6 is a diagram showing an example of information that may be exchanged among the recommendation service 210, the application service 225, and the browser application 355 to provide recommendations to be presented to the user on a tab group control pane of the user interfaces 405 or 505. The browser application 355 may provide contextual information 625 to the application service 225 in response to the user activating a tab group control element on the user interfaces 405 or 505. The contextual information 625 may include information that identifies the user for whom the recommendations are to be provided and may include application information that identifies an application for which the recommendation is being requested. The contextual information 625 may include authentication credentials, such as but not limited to an authentication token, that may be used to authenticate a user of the browser application 355 with the application service 225 and/or the recommendation service 210. The application service 225 may forward the contextual information 630 to the recommendation service 210. The recommendation service 210 may provide the contextual information 630 to the request processing unit 305 of the recommendation service 210. The browser application 355 may include a request for the recommendations with the contextual information 625, and the application service 225 may forward the request with the contextual information 630 to the recommendation service 210.

The recommendation service 210 may analyze the contextual information 630 and the request information (if provided) to generate recommendation information 635. The recommendation information 635 may include one or more types of document recommendations as discussed in the preceding examples. The application service 225 may receive the recommendation information 635 and send the recommendation information 640 to the browser application 355 on the client device 205. In some implementations, the browser application 355 may communicate directly with the recommendation service 210 over a network connection rather than having the application service 225 serve as an intermediary as in the example implementation shown in FIG. 6.

Figure 7:
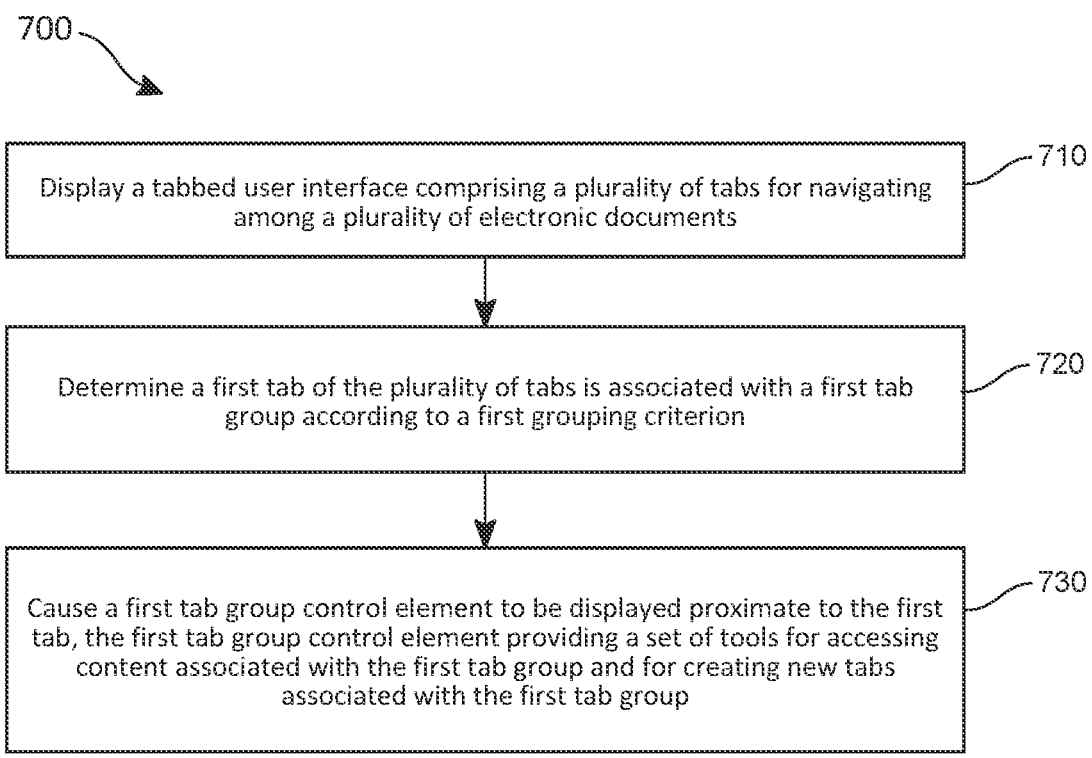
FIG. 7 is a flow diagram of a process for providing a tabbed user interface that may be implemented by the language analysis service.

FIG. 7 is an example flow chart of an example process 700 for providing a tabbed user interface that may be implemented by the browser application 355 or native application 350 of the client device 205. The process 700 may include an operation 710 of displaying a tabbed user interface comprising a plurality of tabs for navigating among a plurality of electronic documents. The tabbed user interface may be presented by the browser application 355 or native application 350 of the client device 205 to enable a user to access, create, and/or otherwise consume electronic content. The electronic content may be accessed via one or more web-based applications provided by the application services 225a and/or 225b.

The process 700 may include an operation 720 of determining a first tab of the plurality of tabs is associated with a first tab group according to a first grouping criterion. As discussed in the preceding examples, the tab grouping determination unit 375 of the browser application 355 may determine the web-based application associated with a particular tab of the tabbed user interface.

The process 700 may include an operation 730 of causing a first tab group control element to be displayed proximate to the first tab. The first tab group control element provides a set of tools for accessing content associated with the first tab group and for creating new tabs associated with the first tab group. The first tab group control element may provide a set of tools for accessing content associated with the first application and for creating new tabs associated with the first application. As shown at least in FIGS. 4A-4H and tabbed user interfaces 305 and 405 may display a tab group control element proximate to the tabs associated with the first application. The tab group control element is displayed along with the tabs in the tabbed user interface. The tab group control element is placed proximate to the tabs associated with the first tab group and provides convenient tools for creating new tabs associated with the application or applications associated with the tab group, for accessing content associated with the application or applications, and/or for performing other actions associated with the application or applications.

The detailed examples of systems, devices, and techniques described in connection with FIGS. 1-7 are presented herein for illustration of the disclosure and its benefits. Such examples of use should not be construed to be limitations on the logical process embodiments of the disclosure, nor should variations of user interface methods from those described herein be considered outside the scope of the present disclosure. It is understood that references to displaying or presenting an item (such as, but not limited to, presenting an image on a display device, presenting audio via one or more loudspeakers, and/or vibrating a device) include issuing instructions, commands, and/or signals causing, or reasonably expected to cause, a device or system to display or present the item. In some embodiments, various features described in FIGS. 1-7 are implemented in respective modules, which may also be referred to as, and/or include, logic, components, units, and/or mechanisms. Modules may constitute either software modules (for example, code embodied on a machine-readable medium) or hardware modules.

In some examples, a hardware module may be implemented mechanically, electronically, or with any suitable combination thereof. For example, a hardware module may include dedicated circuitry or logic that is configured to perform certain operations. For example, a hardware module may include a special-purpose processor, such as a field-programmable gate array (FPGA) or an Application Specific Integrated Circuit (ASIC). A hardware module may also include programmable logic or circuitry that is temporarily configured by software to perform certain operations and may include a portion of machine-readable medium data and/or instructions for such configuration. For example, a hardware module may include software encompassed within a programmable processor configured to execute a set of software instructions. It will be appreciated that the decision to implement a hardware module mechanically, in dedicated and permanently configured circuitry, or in temporarily configured circuitry (for example, configured by software) may be driven by cost, time, support, and engineering considerations.

Accordingly, the phrase "hardware module" should be understood to encompass a tangible entity capable of performing certain operations and may be configured or arranged in a certain physical manner, be that an entity that is physically constructed, permanently configured (for example, hardwired), and/or temporarily configured (for example, programmed) to operate in a certain manner or to perform certain operations described herein. As used herein, "hardware-implemented module" refers to a hardware module. Considering examples in which hardware modules are temporarily configured (for example, programmed), each of the hardware modules need not be configured or instantiated at any one instance in time. For example, where a hardware module includes a programmable processor configured by software to become a special-purpose processor, the programmable processor may be configured as respectively different special-purpose processors (for example, including different hardware modules) at different times. Software may accordingly configure a processor or processors, for example, to constitute a particular hardware module at one instance of time and to constitute a different hardware module at a different instance of time. A hardware module implemented using one or more processors may be referred to as being "processor implemented" or "computer implemented."

Hardware modules can provide information to, and receive information from, other hardware modules. Accordingly, the described hardware modules may be regarded as being communicatively coupled. Where multiple hardware modules exist contemporaneously, communications may be achieved through signal transmission (for example, over appropriate circuits and buses) between or among two or more of the hardware modules. In embodiments in which multiple hardware modules are configured or instantiated at different times, communications between such hardware modules may be achieved, for example, through the storage and retrieval of information in memory devices to which the multiple hardware modules have access. For example, one hardware module may perform an operation and store the output in a memory device, and another hardware module may then access the memory device to retrieve and process the stored output.

In some examples, at least some of the operations of a method may be performed by one or more processors or processor-implemented modules. Moreover, the one or more processors may also operate to support performance of the relevant operations in a "cloud computing" environment or as a "software as a service" (SaaS). For example, at least some of the operations may be performed by, and/or among, multiple computers (as examples of machines including processors), with these operations being accessible via a network (for example, the Internet) and/or via one or more software interfaces (for example, an application program interface (API)). The performance of certain of the operations may be distributed among the processors, not only residing within a single machine, but deployed across several machines. Processors or processor-implemented modules may be in a single geographic location (for example, within a home or office environment, or a server farm), or may be distributed across multiple geographic locations.

Figure 8:
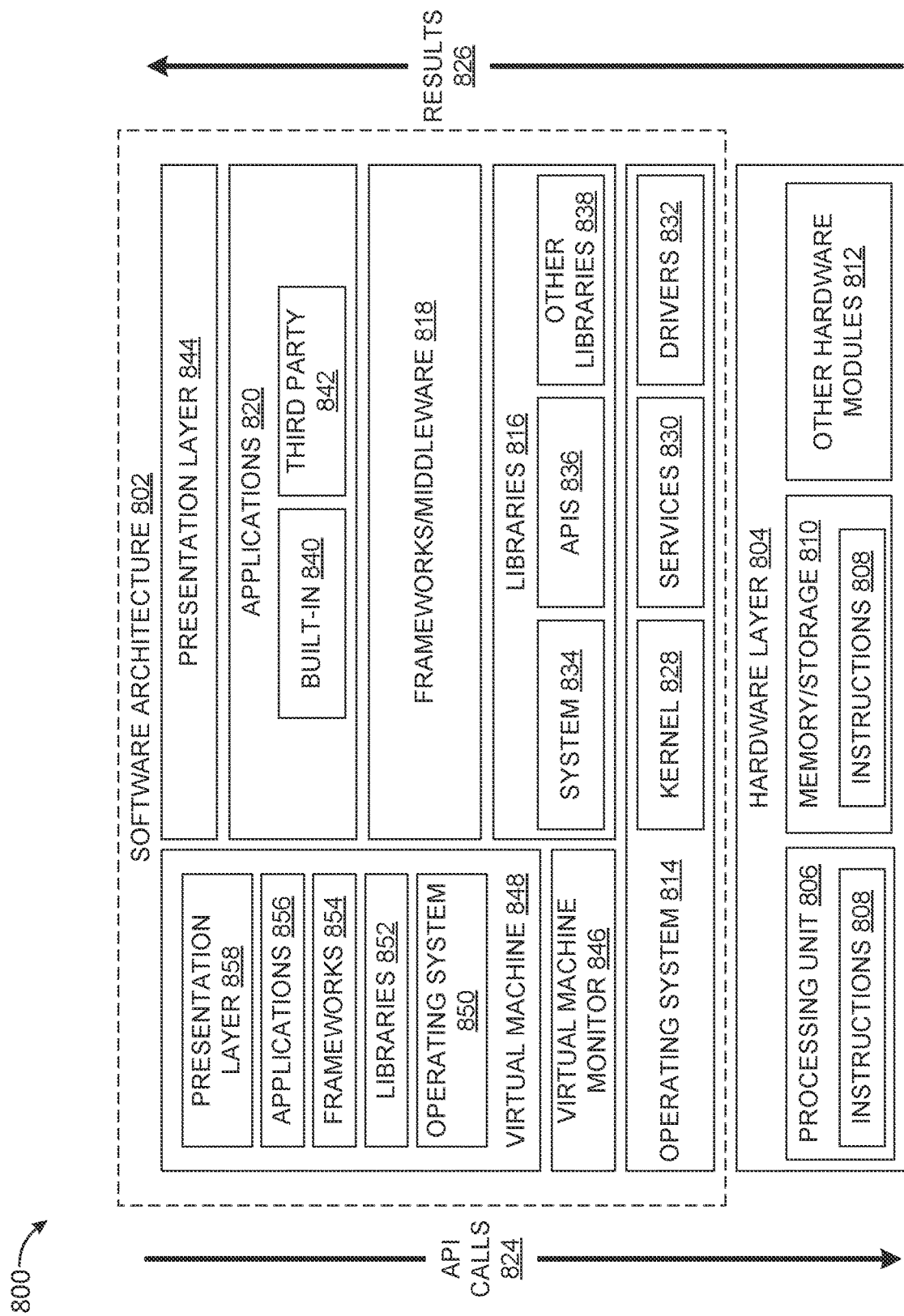
FIG. 8 is a block diagram showing an example software architecture, various portions of which may be used in conjunction with various hardware architectures herein described, which may implement any of the described features.

FIG. 8 is a block diagram 800 illustrating an example software architecture 802, various portions of which may be used in conjunction with various hardware architectures herein described, which may implement any of the above-described features. FIG. 8 is a non-limiting example of a software architecture, and it will be appreciated that many other architectures may be implemented to facilitate the functionality described herein. The software architecture 802 may execute on hardware such as a machine 900 of FIG. 9 that includes, among other things, processors 910, memory 930, and input/output (I/O) components 950. A representative hardware layer 804 is illustrated and can represent, for example, the machine 900 of FIG. 9. The representative hardware layer 804 includes a processing unit 806 and associated executable instructions 808. The executable instructions 808 represent executable instructions of the software architecture 802, including implementation of the methods, modules and so forth described herein. The hardware layer 804 also includes a memory/storage 810, which also includes the executable instructions 808 and accompanying data. The hardware layer 804 may also include other hardware modules 812. Instructions 808 held by processing unit 806 may be portions of instructions 808 held by the memory/storage 810.

The example software architecture 802 may be conceptualized as layers, each providing various functionality. For example, the software architecture 802 may include layers and components such as an operating system (OS) 814, libraries 816, frameworks 818, applications 820, and a presentation layer 844. Operationally, the applications 820 and/or other components within the layers may invoke API calls 824 to other layers and receive corresponding results 826. The layers illustrated are representative in nature and other software architectures may include additional or different layers. For example, some mobile or special purpose operating systems may not provide the frameworks/middleware 818.

The OS 814 may manage hardware resources and provide common services. The OS 814 may include, for example, a kernel 828, services 830, and drivers 832. The kernel 828 may act as an abstraction layer between the hardware layer 804 and other software layers. For example, the kernel 828 may be responsible for memory management, processor management (for example, scheduling), component management, networking, security settings, and so on. The services 830 may provide other common services for the other software layers. The drivers 832 may be responsible for controlling or interfacing with the underlying hardware layer 804. For instance, the drivers 832 may include display drivers, camera drivers, memory/storage drivers, peripheral device drivers (for example, via Universal Serial Bus (USB)), network and/or wireless communication drivers, audio drivers, and so forth depending on the hardware and/or software configuration.

The libraries 816 may provide a common infrastructure that may be used by the applications 820 and/or other components and/or layers. The libraries 816 typically provide functionality for use by other software modules to perform tasks, rather than rather than interacting directly with the OS 814. The libraries 816 may include system libraries 834 (for example, C standard library) that may provide functions such as memory allocation, string manipulation, file operations. In addition, the libraries 816 may include API libraries 836 such as media libraries (for example, supporting presentation and manipulation of image, sound, and/or video data formats), graphics libraries (for example, an OpenGL library for rendering 2D and 3D graphics on a display), database libraries (for example, SQLite or other relational database functions), and web libraries (for example, WebKit that may provide web browsing functionality). The libraries 816 may also include a wide variety of other libraries 838 to provide many functions for applications 820 and other software modules.

The frameworks 818 (also sometimes referred to as middleware) provide a higher-level common infrastructure that may be used by the applications 820 and/or other software modules. For example, the frameworks 818 may provide various graphic user interface (GUI) functions, high-level resource management, or high-level location services. The frameworks 818 may provide a broad spectrum of other APIs for applications 820 and/or other software modules.

The applications 820 include built-in applications 840 and/or third-party applications 842. Examples of built-in applications 840 may include, but are not limited to, a contacts application, a browser application, a location application, a media application, a messaging application, and/or a game application. Third-party applications 842 may include any applications developed by an entity other than the vendor of the particular platform. The applications 820 may use functions available via OS 814, libraries 816, frameworks 818, and presentation layer 844 to create user interfaces to interact with users.

Some software architectures use virtual machines, as illustrated by a virtual machine 848. The virtual machine 848 provides an execution environment where applications/modules can execute as if they were executing on a hardware machine (such as the machine 900 of FIG. 9, for example). The virtual machine 848 may be hosted by a host OS (for example, OS 814) or hypervisor, and may have a virtual machine monitor 846 which manages operation of the virtual machine 848 and interoperation with the host operating system. A software architecture, which may be different from software architecture 802 outside of the virtual machine, executes within the virtual machine 848 such as an OS 850, libraries 852, frameworks 854, applications 856, and/or a presentation layer 858.

Figure 9:
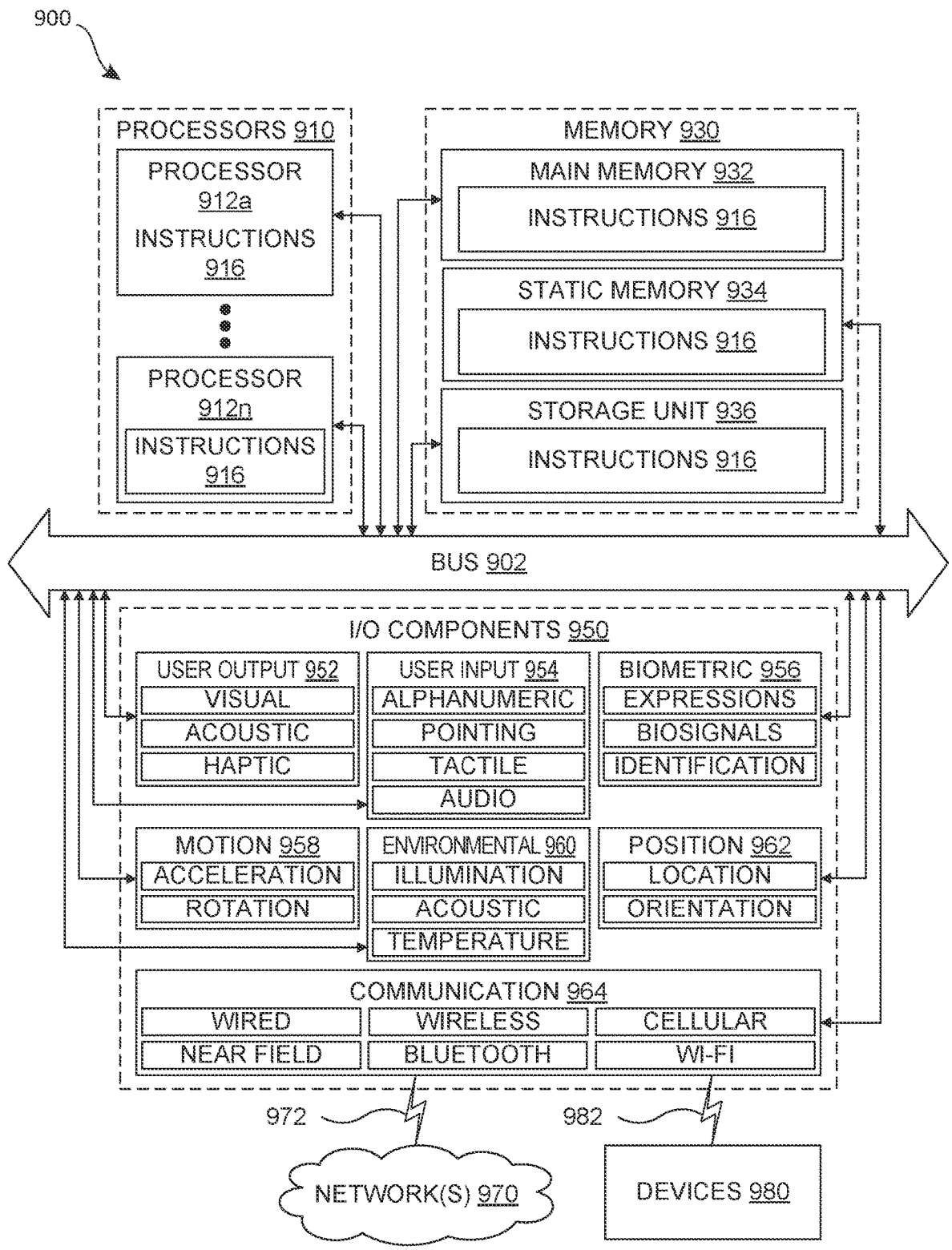
FIG. 9 is a block diagram showing components of an example machine configured to read instructions from a machine-readable medium and perform any of the features described herein.

FIG. 9 is a block diagram illustrating components of an example machine 900 configured to read instructions from a machine-readable medium (for example, a machine-readable storage medium) and perform any of the features described herein. The example machine 900 is in a form of a computer system, within which instructions 916 (for example, in the form of software components) for causing the machine 900 to perform any of the features described herein may be executed. As such, the instructions 916 may be used to implement modules or components described herein. The instructions 916 cause unprogrammed and/or unconfigured machine 900 to operate as a particular machine configured to carry out the described features. The machine 900 may be configured to operate as a standalone device or may be coupled (for example, networked) to other machines. In a networked deployment, the machine 900 may operate in the capacity of a server machine or a client machine in a server-client network environment, or as a node in a peer-to-peer or distributed network environment. Machine 900 may be embodied as, for example, a server computer, a client computer, a personal computer (PC), a tablet computer, a laptop computer, a netbook, a set-top box (STB), a gaming and/or entertainment system, a smart phone, a mobile device, a wearable device (for example, a smart watch), and an Internet of Things (IoT) device. Further, although only a single machine 900 is illustrated, the term "machine" includes a collection of machines that individually or jointly execute the instructions 916.

The machine 900 may include processors 910, memory 930, and I/O components 950, which may be communicatively coupled via, for example, a bus 902. The bus 902 may include multiple buses coupling various elements of machine 900 via various bus technologies and protocols. In an example, the processors 910 (including, for example, a central processing unit (CPU), a graphics processing unit (GPU), a digital signal processor (DSP), an ASIC, or a suitable combination thereof) may include one or more processors 912a to 912n that may execute the instructions 916 and process data. In some examples, one or more processors 910 may execute instructions provided or identified by one or more other processors 910. The term "processor" includes a multi-core processor including cores that may execute instructions contemporaneously. Although FIG. 9 shows multiple processors, the machine 900 may include a single processor with a single core, a single processor with multiple cores (for example, a multi-core processor), multiple processors each with a single core, multiple processors each with multiple cores, or any combination thereof. In some examples, the machine 900 may include multiple processors distributed among multiple machines.

The memory/storage 930 may include a main memory 932, a static memory 934, or other memory, and a storage unit 936, both accessible to the processors 910 such as via the bus 902. The storage unit 936 and memory 932, 934 store instructions 916 embodying any one or more of the functions described herein. The memory/storage 930 may also store temporary, intermediate, and/or long-term data for processors 910. The instructions 916 may also reside, completely or partially, within the memory 932, 934, within the storage unit 936, within at least one of the processors 910 (for example, within a command buffer or cache memory), within memory at least one of I/O components 950, or any suitable combination thereof, during execution thereof. Accordingly, the memory 932, 934, the storage unit 936, memory in processors 910, and memory in I/O components 950 are examples of machine-readable media.

As used herein, "machine-readable medium" refers to a device able to temporarily or permanently store instructions and data that cause machine 900 to operate in a specific fashion, and may include, but is not limited to, random-access memory (RAM), read-only memory (ROM), buffer memory, flash memory, optical storage media, magnetic storage media and devices, cache memory, network-accessible or cloud storage, other types of storage and/or any suitable combination thereof. The term "machine-readable medium" applies to a single medium, or combination of multiple media, used to store instructions (for example, instructions 916) for execution by a machine 900 such that the instructions, when executed by one or more processors 910 of the machine 900, cause the machine 900 to perform and one or more of the features described herein. Accordingly, a "machine-readable medium" may refer to a single storage device, as well as "cloud-based" storage systems or storage networks that include multiple storage apparatus or devices. The term "machine-readable medium" excludes signals per se.

The I/O components 950 may include a wide variety of hardware components adapted to receive input, provide output, produce output, transmit information, exchange information, capture measurements, and so on. The specific I/O components 950 included in a particular machine will depend on the type and/or function of the machine. For example, mobile devices such as mobile phones may include a touch input device, whereas a headless server or IoT device may not include such a touch input device. The particular examples of I/O components illustrated in FIG. 9 are in no way limiting, and other types of components may be included in machine 900. The grouping of I/O components 950 are merely for simplifying this discussion, and the grouping is in no way limiting. In various examples, the I/O components 950 may include user output components 952 and user input components 954. User output components 952 may include, for example, display components for displaying information (for example, a liquid crystal display (LCD) or a projector), acoustic components (for example, speakers), haptic components (for example, a vibratory motor or force-feedback device), and/or other signal generators. User input components 954 may include, for example, alphanumeric input components (for example, a keyboard or a touch screen), pointing components (for example, a mouse device, a touchpad, or another pointing instrument), and/or tactile input components (for example, a physical button or a touch screen that provides location and/or force of touches or touch gestures) configured for receiving various user inputs, such as user commands and/or selections.

In some examples, the I/O components 950 may include biometric components 956, motion components 958, environmental components 960, and/or position components 962, among a wide array of other physical sensor components. The biometric components 956 may include, for example, components to detect body expressions (for example, facial expressions, vocal expressions, hand or body gestures, or eye tracking), measure biosignals (for example, heart rate or brain waves), and identify a person (for example, via voice-, retina-, fingerprint-, and/or facial-based identification). The motion components 958 may include, for example, acceleration sensors (for example, an accelerometer) and rotation sensors (for example, a gyroscope). The environmental components 960 may include, for example, illumination sensors, temperature sensors, humidity sensors, pressure sensors (for example, a barometer), acoustic sensors (for example, a microphone used to detect ambient noise), proximity sensors (for example, infrared sensing of nearby objects), and/or other components that may provide indications, measurements, or signals corresponding to a surrounding physical environment. The position components 962 may include, for example, location sensors (for example, a Global Position System (GPS) receiver), altitude sensors (for example, an air pressure sensor from which altitude may be derived), and/or orientation sensors (for example, magnetometers).

The I/O components 950 may include communication components 964, implementing a wide variety of technologies operable to couple the machine 900 to network(s) 970 and/or device(s) 980 via respective communicative couplings 972 and 982. The communication components 964 may include one or more network interface components or other suitable devices to interface with the network(s) 970. The communication components 964 may include, for example, components adapted to provide wired communication, wireless communication, cellular communication, Near Field Communication (NFC), Bluetooth communication, Wi-Fi, and/or communication via other modalities. The device(s) 980 may include other machines or various peripheral devices (for example, coupled via USB).

In some examples, the communication components 964 may detect identifiers or include components adapted to detect identifiers. For example, the communication components 964 may include Radio Frequency Identification (RFID) tag readers, NFC detectors, optical sensors (for example, one- or multi-dimensional bar codes, or other optical codes), and/or acoustic detectors (for example, microphones to identify tagged audio signals). In some examples, location information may be determined based on information from the communication components 962, such as, but not limited to, geo-location via Internet Protocol (IP) address, location via Wi-Fi, cellular, NFC, Bluetooth, or other wireless station identification and/or signal triangulation.

While various embodiments have been described, the description is intended to be exemplary, rather than limiting, and it is understood that many more embodiments and implementations are possible that are within the scope of the embodiments. Although many possible combinations of features are shown in the accompanying figures and discussed in this detailed description, many other combinations of the disclosed features are possible. Any feature of any embodiment may be used in combination with or substituted for any other feature or element in any other embodiment unless specifically restricted. Therefore, it will be understood that any of the features shown and/or discussed in the present disclosure may be implemented together in any suitable combination. Accordingly, the embodiments are not to be restricted except in light of the attached claims and their equivalents. Also, various modifications and changes may be made within the scope of the attached claims.

While the foregoing has described what are considered to be the best mode and/or other examples, it is understood that various modifications may be made therein and that the subject matter disclosed herein may be implemented in various forms and examples, and that the teachings may be applied in numerous applications, only some of which have been described herein. It is intended by the following claims to claim any and all applications, modifications and variations that fall within the true scope of the present teachings.

Unless otherwise stated, all measurements, values, ratings, positions, magnitudes, sizes, and other specifications that are set forth in this specification, including in the claims that follow, are approximate, not exact. They are intended to have a reasonable range that is consistent with the functions to which they relate and with what is customary in the art to which they pertain.

The scope of protection is limited solely by the claims that now follow. That scope is intended and should be interpreted to be as broad as is consistent with the ordinary meaning of the language that is used in the claims when interpreted in light of this specification and the prosecution history that follows and to encompass all structural and functional equivalents. Notwithstanding, none of the claims are intended to embrace subject matter that fails to satisfy the requirement of Sections 101, 102, or 103 of the Patent Act, nor should they be interpreted in such a way. Any unintended embracement of such subject matter is hereby disclaimed.

Except as stated immediately above, nothing that has been stated or illustrated is intended or should be interpreted to cause a dedication of any component, step, feature, object, benefit, advantage, or equivalent to the public, regardless of whether it is or is not recited in the claims.

It will be understood that the terms and expressions used herein have the ordinary meaning as is accorded to such terms and expressions with respect to their corresponding respective areas of inquiry and study except where specific meanings have otherwise been set forth herein. Relational terms such as first and second and the like may be used solely to distinguish one entity or action from another without necessarily requiring or implying any actual such relationship or order between such entities or actions. The terms "comprises," "comprising," or any other variation thereof, are intended to cover a non-exclusive inclusion, such that a process, method, article, or apparatus that comprises a list of elements does not include only those elements but may include other elements not expressly listed or inherent to such process, method, article, or apparatus. An element proceeded by "a" or "an" does not, without further constraints, preclude the existence of additional identical elements in the process, method, article, or apparatus that comprises the element.

The Abstract of the Disclosure is provided to allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in various examples for the purpose of streamlining the disclosure. This method of disclosure is not to be interpreted as reflecting an intention that the claims require more features than are expressly recited in each claim. Rather, as the following claims reflect, inventive subject matter lies in less than all features of a single disclosed example. Thus, the following claims are hereby incorporated into the Detailed Description, with each claim standing on its own as a separately claimed subject matter.

What is claimed is:

1. A data processing system comprising:
 a processor; and
 a machine-readable storage medium storing executable instructions that, when executed by the processor, cause the processor alone or in combination with other processors to control the data processing system to perform operations of:
  displaying a tabbed user interface including a plurality of tabs on a tab bar for navigating among a plurality of electronic documents;
  determining a first tab of the plurality of tabs is associated with a first application;
  causing a first tab control element to be displayed on the tab bar adjacent to the first tab; and
  in response to activation of the first tab control element, providing in the first tab control element a set of tools associated with the first application for performing application-specific tasks associated with the first application.

2. The data processing system of claim 1, wherein determining the first tab of the plurality of tabs is associated with the first application further comprises:
creating new tabs associated with the first application.

3. The data processing system of claim 1, wherein the machine-readable storage medium includes instructions configured to cause the processor alone or in combination with other processors to control the data processing system to perform operations of:
grouping a first subset of the plurality of tabs associated with a first criterion into a first tab group;
causing tabs of the first tab group to be displayed adjacent to one another on the tabbed user interface; and
causing the first tab control element to be displayed proximate to the tabs of the first tab group on the tabbed user interface.

4. The data processing system of claim 3, wherein the machine-readable storage medium includes instructions configured to cause the processor alone or in combination with other processors to control the data processing system to perform operations of:
determining a second tab of the plurality of tabs is associated with a second tab group; and
causing a second tab control element to be displayed proximate to the second tab of the plurality of tabs, the second tab control element providing a set of tools for accessing content associated with a second tab group and for creating new tabs associated with the second tab group.

5. The data processing system of claim 4, wherein the machine-readable storage medium includes instructions configured to cause the processor alone or in combination with other processors to control the data processing system to perform operations of:
determining the second tab of the plurality of tabs is associated with a second application, and wherein the second tab control element is a second application-specific tab control element providing a set of tools for accessing content associated with the second application and for creating new tabs associated with the second application.

6. The data processing system of claim 4, wherein the machine-readable storage medium includes instructions configured to cause the processor alone or in combination with other processors to control the data processing system to perform operations of:
determining that the second tab is a currently active tab of the tabbed user interface; and
collapsing the first tab group to hide the tabs associated with the first tab group responsive to determining that the second tab is currently active.

7. The data processing system of claim 6, wherein the machine-readable storage medium includes instructions configured to cause the processor alone or in combination with other processors to control the data processing system to perform operations of:
receiving a first user input to activate the first tab control element; and
causing the tabs associated with the first tab group to be displayed on the tabbed user interface proximate to the first tab control element.

8. The data processing system of claim 6, wherein the machine-readable storage medium includes instructions configured to cause the processor alone or in combination with other processors to control the data processing system to perform operations of:
receiving a first user input indicating that a pointer is positioned over the first tab control element without clicking on or otherwise interacting with the first tab control element;
causing the tabs associated with the first tab group to be displayed on the tabbed user interface proximate to the first tab control element while the pointer is positioned over the first tab control element; and
causing the tabs associated with the first tab group to be hidden once the pointer is no longer positioned over the first tab control element.

9. The data processing system of claim 6, wherein the machine-readable storage medium includes instructions configured to cause the processor alone or in combination with other processors to control the data processing system to perform operations of:
receiving a first user input to activate the first tab control element; and
causing a control pane associated with the first tab control element to be displayed proximate to the first tab control element, the control pane comprising one or more controls for controlling various functionality of an application associated with the first tab group.

10. The data processing system of claim 9, wherein the machine-readable storage medium includes instructions configured to cause the processor alone or in combination with other processors to control the data processing system to perform operations of:
analyzing user-related data to identify a list of document recommendations to be presented to a user of the data processing system, the document recommendations including one or more of recently accessed documents, documents shared with the user, or documents identified by one or more machine learning models as being relevant to the user; and
presenting the list of document recommendations on the control pane.

11. The data processing system of claim 3, wherein a behavior of the first tab control element, the tabs associated with the first tab group, or both are configurable by a user of the tabbed user interface.

12. A method implemented in a data processing system for providing a tabbed user interface, the method comprising:
displaying the tabbed user interface comprising a plurality of tabs on a tab bar for navigating among a plurality of electronic documents;
determining a first tab of the plurality of tabs is associated with a first application; and
causing a first tab control element to be displayed on the tab bar adjacent to the first tab, the first tab control element when activated providing in the first tab control element a set of tools associated with the first application for performing application-specific tasks associated with the first application.

13. The method of claim 12, wherein determining the first tab of the plurality of tabs is associated with the first application further comprises:
determining the first tab of the plurality of tabs is associated with a first criterion.

14. The method of claim 13, further comprising:
grouping a first subset of the plurality of tabs associated with the first criterion into a first tab group;
causing tabs of the first tab group to be displayed adjacent to one another on the tabbed user interface; and
causing the first tab control element to be displayed proximate to the tabs of the first tab group on the tabbed user interface.

15. The method of claim 14, further comprising:
determining a second tab of the plurality of tabs is associated with a second tab group; and
causing a second tab control element to be displayed proximate to the second tab of the plurality of tabs, the second tab control element providing a set of tools for accessing content associated with a second tab group and for creating new tabs associated with the second tab group.

16. The method of claim 15, further comprising:
determining the second tab of the plurality of tabs is associated with a second application, and wherein the second tab control element is a second application-specific tab control element providing a set of tools for accessing content associated with the second application and for creating new tabs associated with the second application.

17. The method of claim 15, further comprising:
determining that the second tab is a currently active tab of the tabbed user interface; and
collapsing the first tab group to hide the tabs associated with the first tab group responsive to determining that the second tab is currently active.

18. A machine-readable medium on which are stored instructions that, when executed, cause a processor of a programmable device to perform operations of:
displaying a tabbed user interface comprising a plurality of tabs on a tab bar for navigating among a plurality of electronic documents;
determining a first tab of the plurality of tabs is associated with a first application; and
causing a first tab control element to be displayed on the tab bar adjacent to the first tab, the first tab control element when activated providing in the first tab control element a set of tools associated with the first application for performing application-specific tasks associated with the first application.

19. The machine-readable medium of claim 18, wherein determining the first tab of the plurality of tabs is associated with the first application further comprises:
determining the first tab of the plurality of tabs is associated with a first criterion.

20. The machine-readable medium of claim 19, further comprising instructions configured to cause the processor to perform operations of:
grouping a first subset of the plurality of tabs associated with the first criterion into a first tab group;
causing tabs of the first tab group to be displayed adjacent to one another on the tabbed user interface; and
causing the first tab control element to be displayed proximate to the tabs of the first tab group on the tabbed user interface.

* * * * *